United States Patent
Kennedy et al.

(10) Patent No.: US 11,901,524 B2
(45) Date of Patent: Feb. 13, 2024

(54) BATTERY CELL INTERCONNECT SYSTEM

(71) Applicant: Interplex Industries, Inc., East Providence, RI (US)

(72) Inventors: Craig Kennedy, San Marcos, CA (US); Vu Phan, Garden Grove, CA (US)

(73) Assignee: Interplex Industries, Inc., East Providence, RI (US)

( * ) Notice: Subject to any disclaimer, the term of this patent is extended or adjusted under 35 U.S.C. 154(b) by 537 days.

(21) Appl. No.: 17/284,466

(22) PCT Filed: Oct. 15, 2019

(86) PCT No.: PCT/US2019/056202
§ 371 (c)(1),
(2) Date: Apr. 11, 2021

(87) PCT Pub. No.: WO2020/081492
PCT Pub. Date: Apr. 23, 2020

(65) Prior Publication Data
US 2021/0391602 A1 Dec. 16, 2021

Related U.S. Application Data

(60) Provisional application No. 62/746,758, filed on Oct. 17, 2018.

(51) Int. Cl.
*H01M 10/48* (2006.01)
*H01M 50/519* (2021.01)
(Continued)

(52) U.S. Cl.
CPC ....... *H01M 10/482* (2013.01); *H01M 10/425* (2013.01); *H01M 10/486* (2013.01);
(Continued)

(58) Field of Classification Search
None
See application file for complete search history.

(56) References Cited

U.S. PATENT DOCUMENTS 4,133,101 A 1/1979 Glover
6,972,544 B2 12/2005 Seman, Jr.
(Continued)

FOREIGN PATENT DOCUMENTS

DE 102012223566 A1 6/2014
JP 2016162737 A 9/2016
(Continued)

OTHER PUBLICATIONS

Supplementary European Search Report for EP 3867964, which corresponds to the subject application.
(Continued)

*Primary Examiner* — Alix E Eggerding
(74) *Attorney, Agent, or Firm* — Katterle Nupp LLC; Paul Katterle; Robert Nupp

(57) ABSTRACT

A battery module having a plurality of battery cells disposed in a housing and interconnected by upper and lower interconnect panels stamped from sheets of conductive metal. Each of the upper and lower interconnect panels have a plurality of contacts secured to terminals of the battery cells, respectively. The contacts are at least partially disposed in panel openings extending through the upper and lower interconnect panels. A carrier is provided and includes a lead frame molded into a body of thermoplastic resin. The lead frame connects a plurality of locations on the upper and lower interconnect panels to a monitoring module that measures physical properties at the locations.

20 Claims, 24 Drawing Sheets

(51) Int. Cl.
   *H01M 50/507* (2021.01)
   *H01M 50/522* (2021.01)
   *H01M 10/42* (2006.01)
   *H01M 50/569* (2021.01)
   *H01M 50/50* (2021.01)

(52) U.S. Cl.
   CPC ......... *H01M 50/50* (2021.01); *H01M 50/507* (2021.01); *H01M 50/519* (2021.01); *H01M 50/522* (2021.01); *H01M 50/569* (2021.01); *H01M 2220/20* (2013.01)

(56) References Cited

U.S. PATENT DOCUMENTS

| | | | |
|---|---|---|---|
| 8,865,338 | B2 | 10/2014 | Sugawara |
| 8,975,510 | B2 | 3/2015 | Coakley |
| 9,147,875 | B1 | 9/2015 | Coakley |
| 9,705,121 | B2 | 7/2017 | Fuhr |
| 10,749,148 | B2 | 8/2020 | Sun |
| 10,779,392 | B2 | 9/2020 | Schneider |
| 2010/0062329 | A1 | 3/2010 | Muis |
| 2011/0244283 | A1 | 10/2011 | Seto |
| 2013/0157115 | A1 | 6/2013 | Kobayashi |
| 2014/0212695 | A1 | 7/2014 | Lane |
| 2015/0214524 | A1 | 7/2015 | Takasaki |
| 2017/0005315 | A1 | 1/2017 | Harris |
| 2017/0005371 | A1 | 1/2017 | Chidester |
| 2017/0018750 | A1 | 1/2017 | Wintner |
| 2017/0194610 | A1 | 7/2017 | Tschiggfrei |
| 2017/0256771 | A1 | 9/2017 | Buckhout |
| 2017/0271642 | A1 | 9/2017 | Groshert |
| 2017/0288202 | A1 | 10/2017 | Tarlau |
| 2017/0358832 | A1* | 12/2017 | Sun ................ H01M 50/505 |
| 2018/0049310 | A1 | 2/2018 | Schneider |
| 2018/0108886 | A1 | 4/2018 | Fees |
| 2018/0190960 | A1 | 7/2018 | Harris |
| 2018/0212222 | A1 | 7/2018 | Barton |

FOREIGN PATENT DOCUMENTS

| | | |
|---|---|---|
| KR | 101892116 B1 | 8/2018 |
| WO | WO2016133861 A1 | 8/2016 |
| WO | WO2017152140 A1 | 9/2017 |

OTHER PUBLICATIONS

International Search Report for PCT/US2019/056202 dated Apr. 16, 2020.
Written Opinion of the ISA for PCT/US2019/056202, dated Apr. 16, 2020.

* cited by examiner

BATTERY CELL INTERCONNECT SYSTEM

CROSS-REFERENCE TO RELATED APPLICATION(S)

This application is the U.S. national phase of PCT Application No. PCT/US2019/056202 filed on 15 Oct. 2019, which claims the benefit of priority under 35 U.S.C. § 119(e) to U.S. Provisional Patent Application No.: 62/746,758, filed on Oct. 17, 2018, both of the foregoing patent applications being herein incorporated by reference.

TECHNICAL FIELD

The present disclosure relates to a battery module and more particularly to a battery cell interconnect system for a battery module.

BACKGROUND

It is known to have a battery module that includes a plurality of battery cells mounted in a housing and connected together so as to have a predetermined capacity and voltage output. Such a battery module is widely used as a power source for vehicles and various types of other devices and equipment. A plurality of the battery modules are often connected together to form a battery system, also having a predetermined capacity and voltage output. In a particular battery module, the battery cells may be connected together in parallel and/or in series to provide a desired capacity and voltage output. Often, the battery cells are arranged closely together and are individually fused to avoid damage or excessive heating of adjacent battery cells and/or other components. In addition, the battery cells may be monitored to quickly detect problems, such as short circuits.

A battery module having the construction described above is conventionally difficult to manufacture and typically requires complicated procedures and specialized machinery. As such, there is a need for a battery module having an improved interconnect system that makes the manufacture of the battery module simpler and less expensive.

SUMMARY

In accordance with the present disclosure a battery module is provided and includes a housing with a cover attachable to a body. A plurality of battery cells is disposed in the housing. Each of the battery cells includes a pair of terminals. The battery module further includes upper and lower interconnect panels, a carrier and a monitoring module. The upper interconnect panel is stamped from a sheet of conductive metal. The upper interconnect panel has a plurality of first panel openings extending therethrough and includes a plurality of first contacts that are secured to the terminals of the battery cells, respectively. The first contacts are at least partially disposed in the first panel openings, respectively. The lower interconnect panel is stamped from another sheet of conductive metal. The lower interconnect panel has a plurality of second panel openings extending therethrough and includes a plurality of second contacts that are secured to the terminals of the battery cells, respectively. The second contacts are at least partially disposed in the second panel openings, respectively. The carrier includes a lead frame molded into a body of thermoplastic resin. The lead frame is connected to a plurality of locations on the upper and lower interconnect panels. At least an upper portion of the body of the carrier is disposed above the upper interconnect panel and at least a lower portion of the body of the carrier is disposed below the lower interconnect panel. The upper and lower interconnect panels are connected to the battery cells to form a circuit arrangement. The monitoring module is connected to the lead frame and is operable to measure electrical properties of the circuit arrangement.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
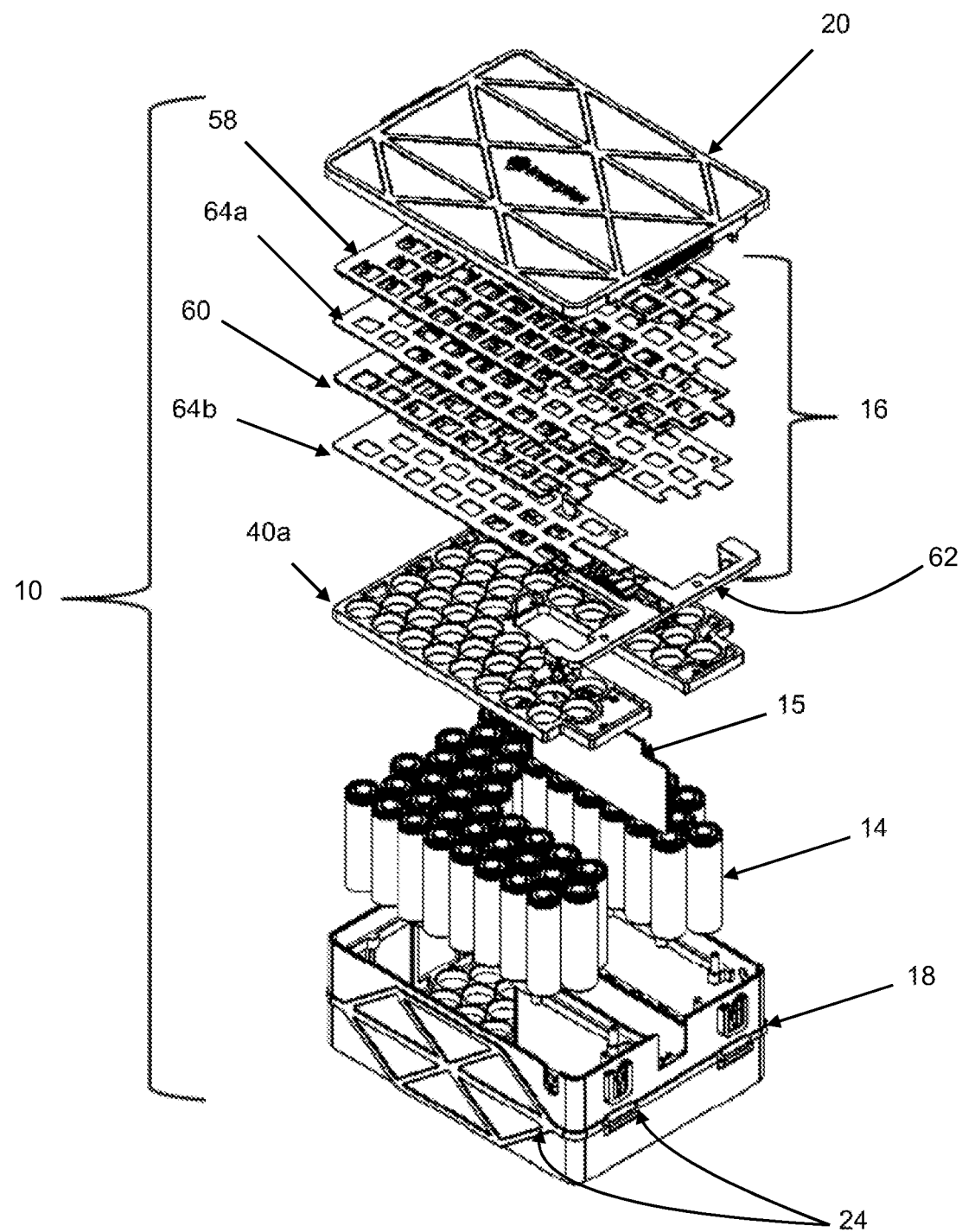
FIG. 1 shows an exploded perspective view of a first battery module constructed in accordance with a first embodiment of the disclosure.

It should be noted that in the detailed descriptions that follow, identical components have the same reference numerals, regardless of whether they are shown in different embodiments of the present disclosure. It should also be noted that for purposes of clarity and conciseness, the drawings may not necessarily be to scale and certain features of the disclosure may be shown in somewhat schematic form.

Spatially relative terms, such as "top", "bottom", "lower", "above", "upper", and the like, are used herein merely for ease of description to describe one element or feature's relationship to another element(s) or feature(s) as they are illustrated in (a) drawing figure(s) being referred to. It will be understood that the spatially relative terms are not meant to be limiting and are intended to encompass different orientations of the device in use or operation in addition to the orientation depicted in the drawings.

The present disclosure is directed to a battery module, which may be used in a battery system for a vehicle, such as an electric vehicle ("EV") or a hybrid electric vehicle ("HEV"). The battery module generally includes a housing, a plurality of battery cells 14, a monitoring module 15 and a battery interconnect system (BIS). In a first embodiment of the disclosure, a first battery module 10 has a first BIS 16, while in a second embodiment of the disclosure, a second battery module 160 has a second BIS 162.

Figure 2:
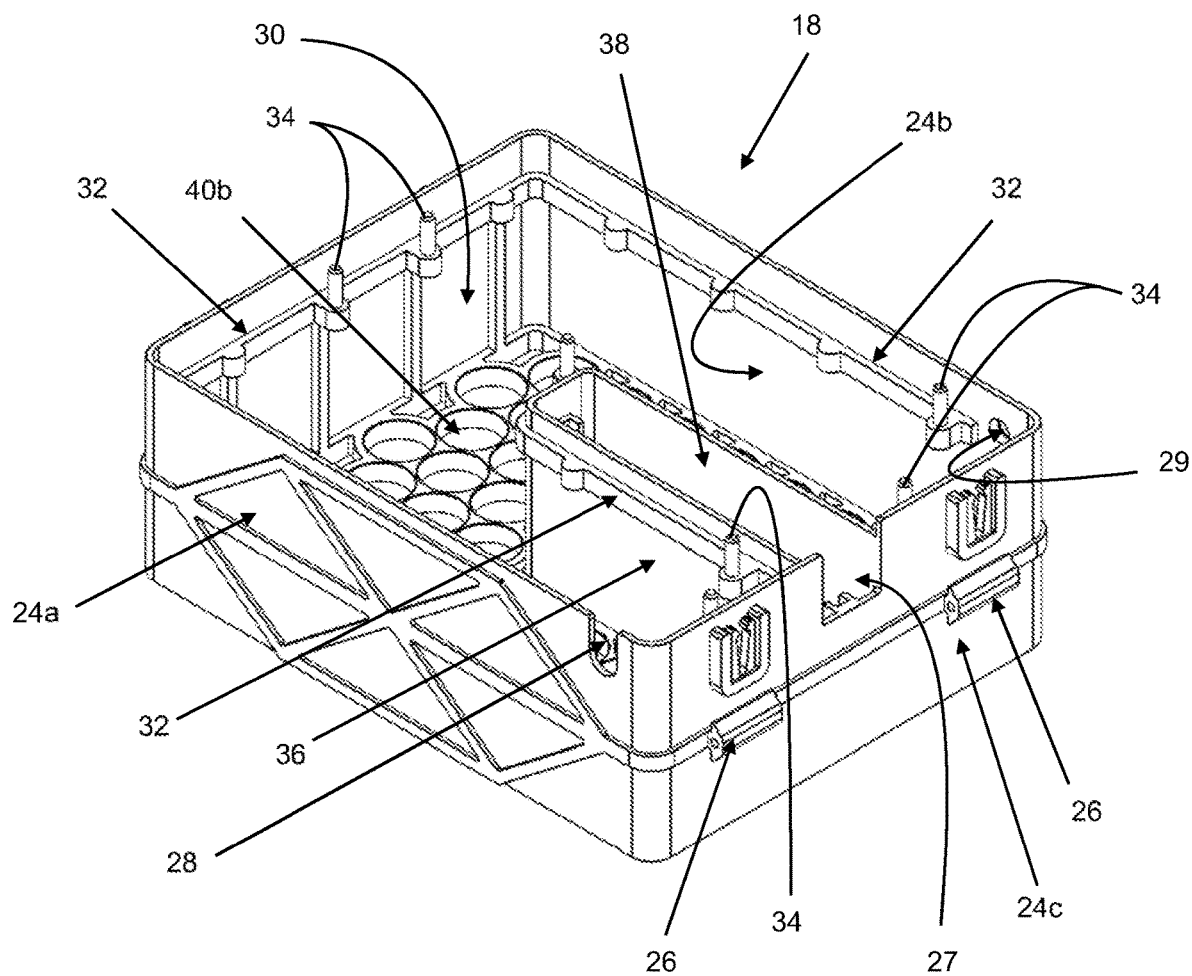
FIG. 2 shows a top perspective view of a housing body of the first battery module of FIG. 1 and a second battery module shown in FIG. 17.
Figure 3:
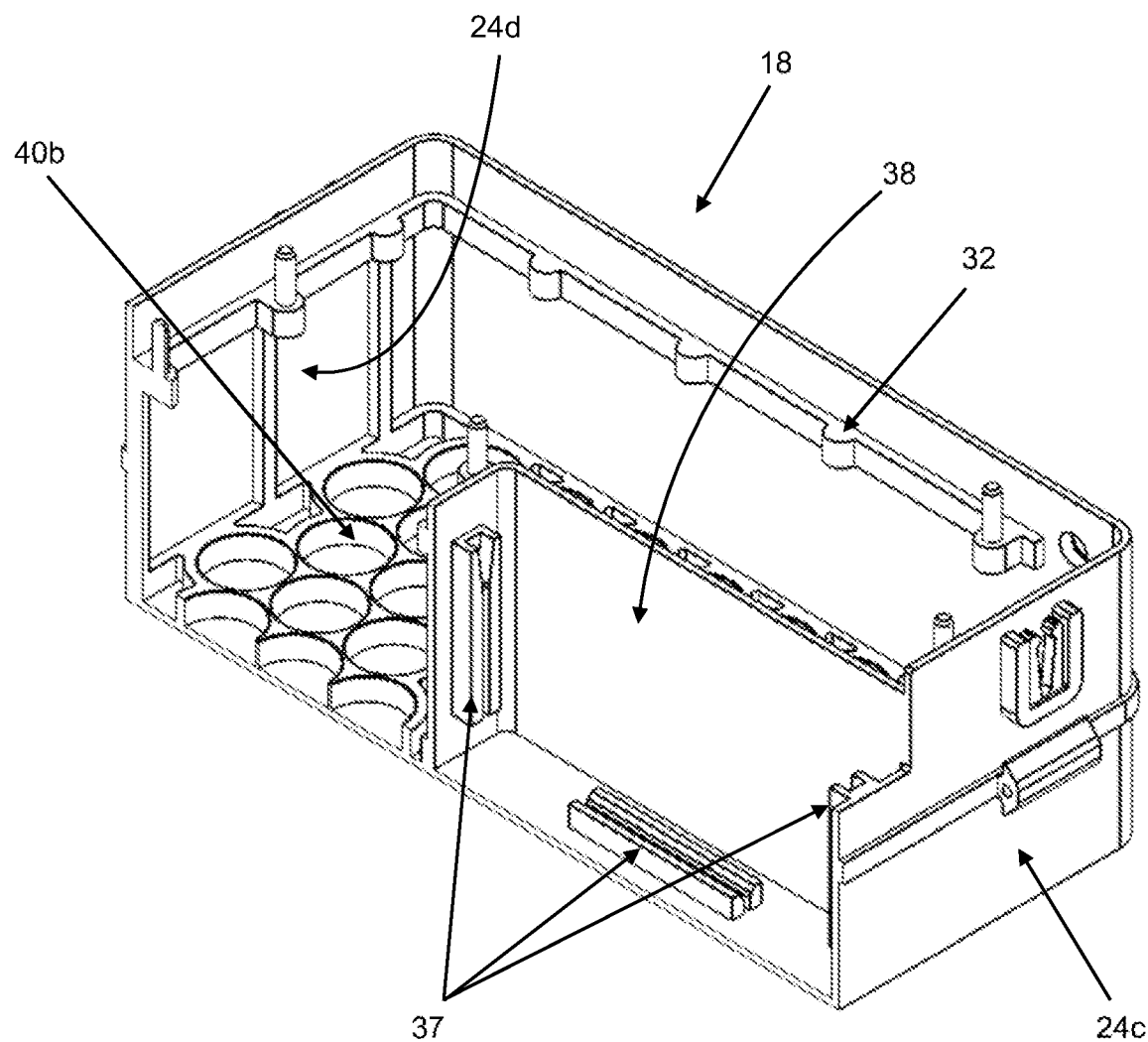
FIG. 3 shows a sectional view of the housing body of FIG. 2.

Referring now to FIGS. 2 and 3, the housing has a body 18 and a lid 20, one or both of which may be formed from a thermoplastic resin. Preferably, the thermoplastic resin has good electrical insulating properties and is heat resistant. Examples of thermoplastic resins that may be used include polypropylene, polyphenylene ether, polyamide, polyester, polyphenylene sulfide, liquid crystal polymer, polystyrene, polycarbonate and polybutylene terephthalate. The body 18 and the lid 20 may be constructed to engage each other so as to form a seal therebetween, whereby the interior of the body 18 is sealed from the outside environment. The body 18 includes a plurality of exterior walls 24. An opposing pair of the exterior walls 24c,d may include projections 26 for receipt in mounting rails, which are used to mount a plurality of battery modules 10 to a structure, such as a chassis of a vehicle. An opening 27 may extend through the exterior wall 24c. In the other pair of opposing exterior walls 24a,b, a slot 28 may be formed in the (front) exterior wall 24a, while a hole 29 may be formed in the (posterior) exterior wall 24b.

The housing body 18 may be generally cuboidal in shape and defines an interior holding space 30 for holding the battery cells 14, which are connected together by the first BIS 16. The housing body 18 may include one or more interior flanges 32 with posts 34 extending upwardly therefrom for mounting the first BIS 16. In the shown embodiments, the housing body 18 further includes one or more interior walls 36 (e.g., three) defining an inner chamber 38, which is delimited from the interior holding space 30. Inside the inner chamber 38, a plurality of mounts 37 are secured to inner surfaces of the interior walls 36. The mounts 37 include slots for holding edges of a printed circuit board (PCB) 39 of the monitoring module 15 (shown in FIG. 15). While the inner chamber 38 (with the monitoring module 15) is shown as being located in the housing body 18, about midway between the exterior walls 24a,b, it should be appreciated that the inner chamber 38 (with the monitoring module 15) may be located elsewhere and may have a different configuration.

Figure 4:
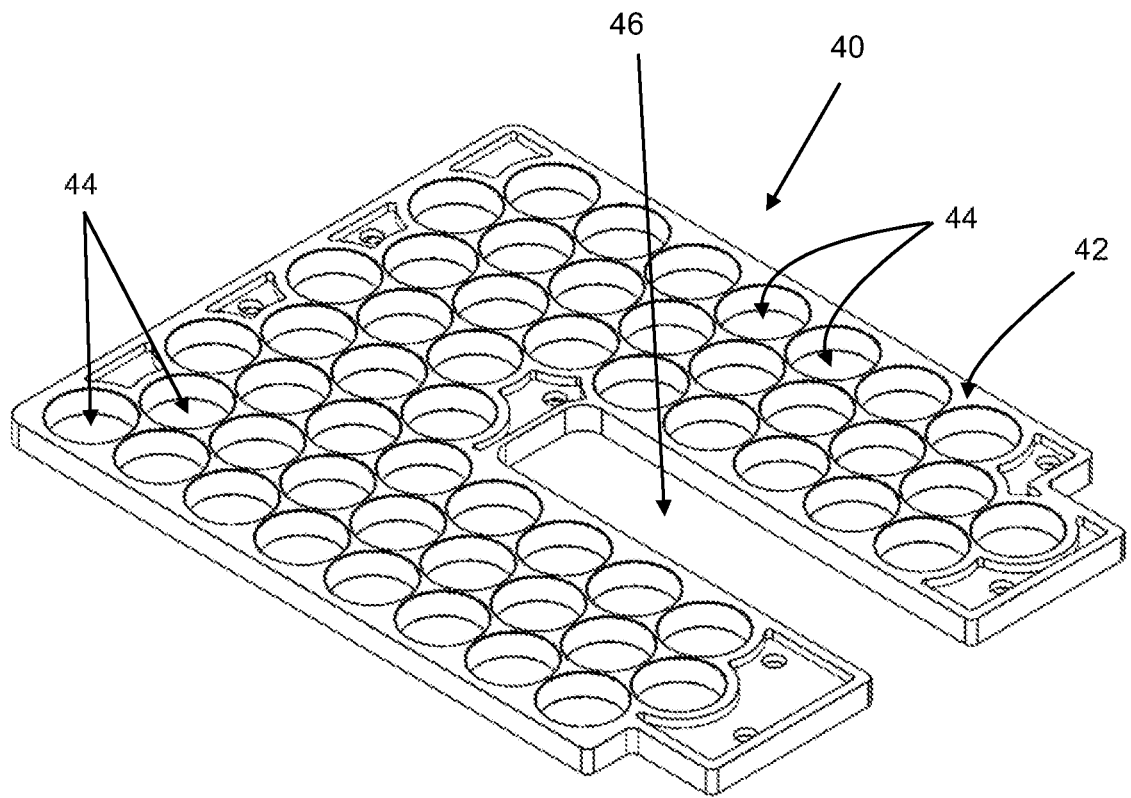
FIG. 4 shows a top perspective view of a cell holder of the first battery module and the second battery module.

Referring now also to FIG. 4, one or more cell holders 40 are disposed in the interior holding space 30 of the housing body 18 and hold(s) the battery cells 14. Each cell holder 40 may be composed of plastic and includes a substrate 42 having a plurality of openings 44 extending therethrough. Each opening 44 snugly holds one of the battery cells 14 and, as such, may be formed by an interior surface of the substrate 42 that has a configuration corresponding to the exterior configuration of a battery cell 14. Thus, if the battery cells 14 are cylindrical (such as shown), the openings 44 may be circular. Upper and lower cell holders 40a,b may be provided, with the upper cell holder 40a retaining upper portions of the battery cells 14 and the lower cell holder 40b retaining lower portions of the battery cells 14. One or both of the upper and lower cell holders 40a,b may be integrally joined to the housing body 18 so as to form a unitary or monolithic structure therewith. For example, the lower cell holder 40b may be part of a bottom wall of the housing body 18. In some embodiments, only a single cell holder 40 may be provided.

In the shown embodiments, an upper cell holder 40a is separate from the housing body 18 and adjoins the first BIS 16, while a lower cell holder 40b is integrally joined to the housing body 18. The upper and lower cell holders 40a,b have enlarged slots 46 formed therein, respectively. The slot 46 in the lower cell holder 40b is disposed around the interior walls 36 defining the inner chamber 38, while the slot 46 in the upper cell holder 40a overlays the inner chamber 38. The battery cells 14 are disposed around interior walls 36 defining the inner chamber 38. As will be described more fully below, the monitoring module 15 is disposed in the inner chamber 38.

Figure 5:
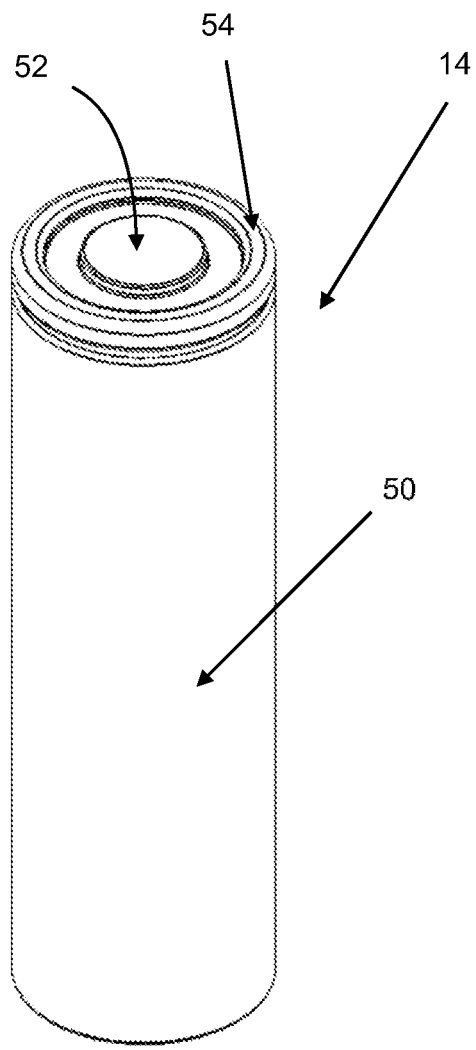
FIG. 5 shows a perspective view of a battery cell of the first battery module and the second battery module.

Referring now to FIGS. 1 and 5, the battery cells 14 may be rechargeable lithium ion (LI-ION) batteries or other type of rechargeable battery. An example of a rechargeable LI-ION battery that may be used is an 18650 type LI-ION battery, having a cylindrical shape with a diameter of about 18 mm and a length of about 65 mm. Alternatively, other rechargeable battery form factors and/or chemistries may be used. In or more embodiments, including the one shown, each battery cell 14 has a cylindrical case 50 with first and second ends. A center positive terminal 52 and a surrounding annular negative terminal 54 are located at the first end.

Figure 6:
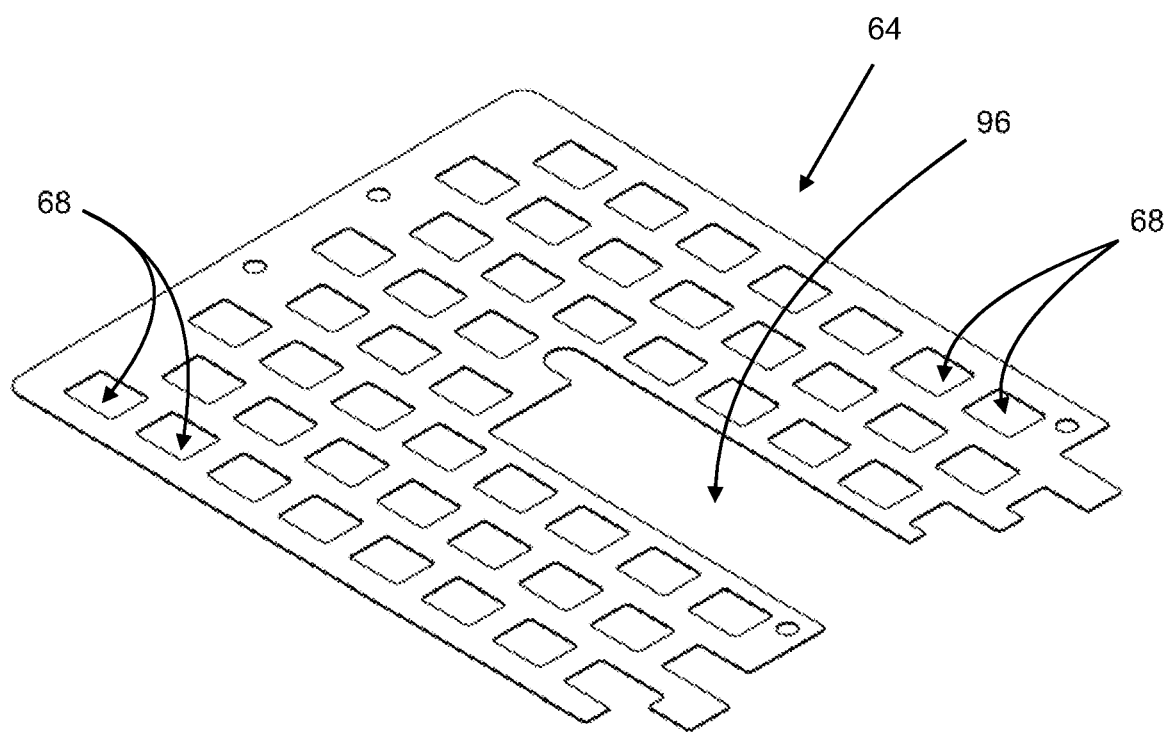
FIG. 6 shows a top perspective view of an insulating layer of the first battery module.

Referring now to FIGS. 1 and 6, in a first embodiment of the disclosure, the first BIS 16 generally includes an upper interconnect layer or panel 58, a lower interconnect layer or panel 60 and a carrier 62. The first BIS 16 may further include one or more electrical insulating layers 64. For example, the first BIS 16 may include an upper insulating layer 64a and a lower insulating layer 64b, as is shown in FIG. 1. The insulating layers 64 may be composed of an insulating plastic, such as polyimide, polyethylene terephthalate, polyether ether ketone, and/or polycarbonate. Each of the insulating layers 64 has a plurality of openings, gaps and/or recesses therein, such as the rectangular openings 68 shown in FIG. 6. Portions of the insulating layers 64 located toward a first side thereof have been removed such that the openings 68 are not fully circumscribed by edges of the layers 64.

The upper insulating layer 64a may be disposed between the upper interconnect panel 58 and the lower interconnect panel 60, while the lower insulating layer 64b may be disposed between the lower interconnect panel 60 and the upper cell holder 40a. In this manner, the lower interconnect panel 60 is disposed between the upper insulating layer 64a and the lower insulating layer 64b. The upper insulating layer 64a may be secured to a bottom side of the upper interconnect panel 58 by adhesive, and the lower insulating layer 64b may be secured to a bottom side of the lower interconnect panel 60 by adhesive. Alternately, the upper and lower interconnect panels 58,60 and the upper and lower insulating layers 64a,b may all be secured together by physical connectors to make the first BIS 16 an integral assembly. In some embodiments, the upper cell holder 40a may also be secured to the first BIS 16 by the same or different connectors.

Figure 7:
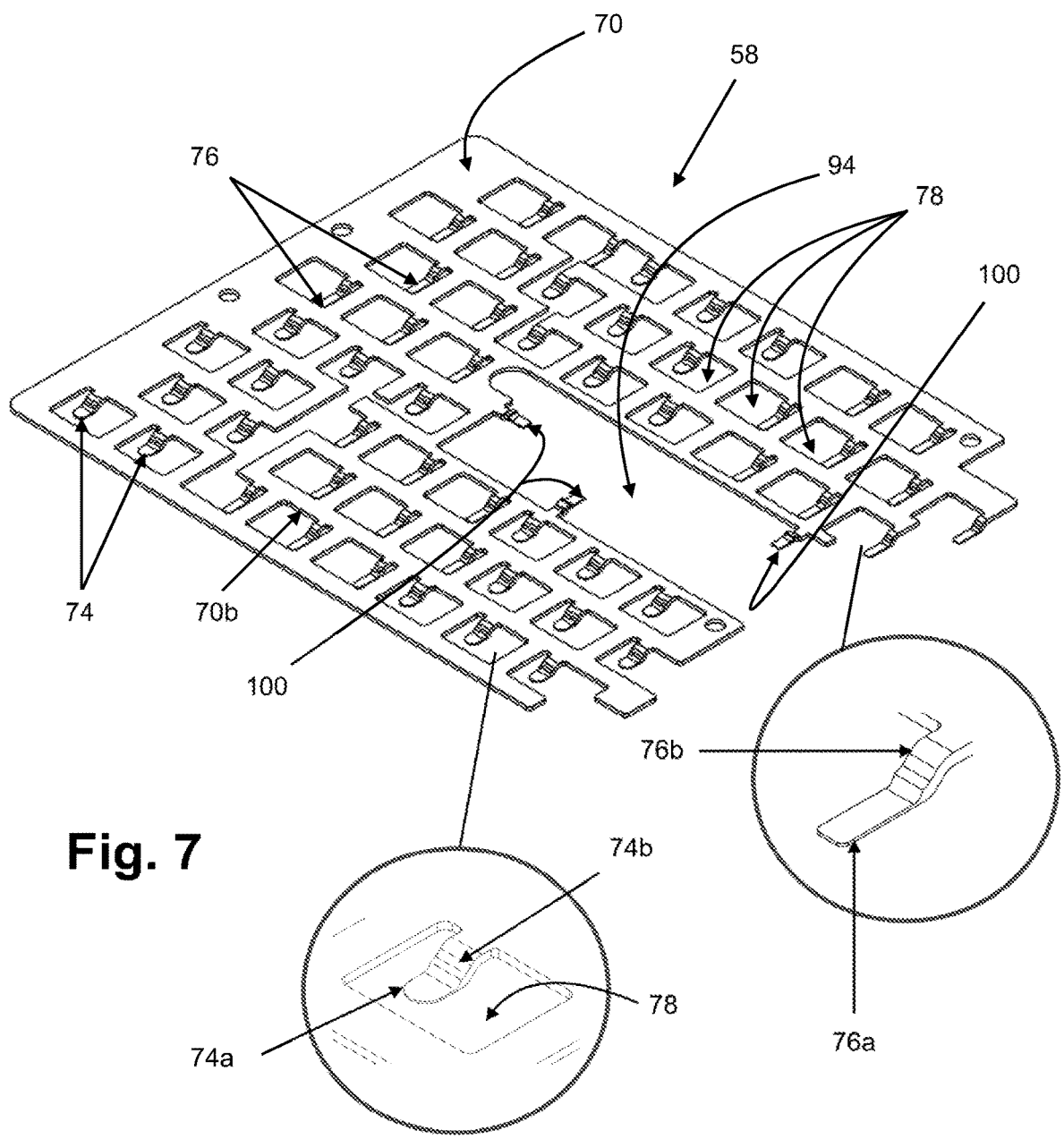
FIG. 7 shows a top perspective view of an upper interconnect panel of the first battery module.
Figure 8:
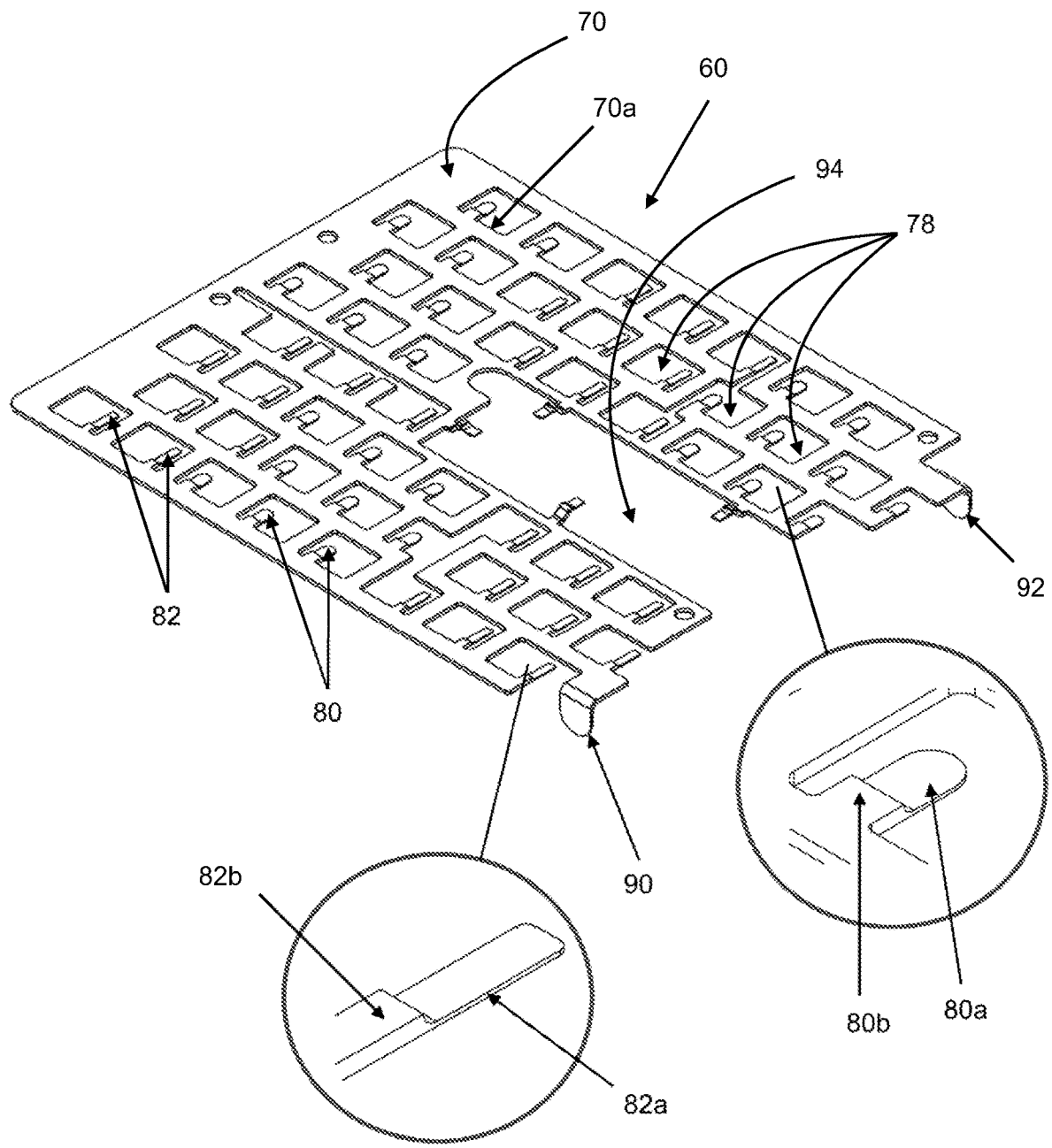
FIG. 8 shows a top perspective view of a lower interconnect panel of the first battery module.

Referring now to FIGS. 7 and 8, the upper and lower interconnect panels 58, 60 are generally rectangular and are each composed of a substrate 70 of conductive metal, such as aluminum, an aluminum alloy, copper or a copper alloy. Each of the upper and lower interconnect panels 58,60 is formed in a stamping operation from a sheet of the conductive metal. The first embodiment is especially suited to having the upper and lower interconnect panels 58, 60 being composed of aluminum, with the substrate 70 having a thickness of from about 0.007 inches (0.178 mm) to about 0.090 inches (2.286 mm) and more preferably about 0.012 inches (0.305 mm). The upper and lower interconnect panels 58,60 may each be one unitary or monolithic structure, or may comprise a plurality of sections, which are separated from each other by gaps or spaces. In this latter embodiment, the interconnect panel 58,60 may be formed so as to be interconnected by sacrificial tie bars to maintain the interconnect panel 58,60 as a monolithic or unitary structure for ease of handling. The sacrificial tie bars may be severed later, such as during or after the assembly of the first BIS 16.

The upper interconnect panel 58 includes a plurality of positive contacts 74 and a plurality of negative contacts 76, while the lower interconnect panel 60 includes a plurality of positive contacts 80 and a plurality of negative contacts 82. In each of the upper and lower interconnect panels 58, 60, the positive contacts 74, 80 and the negative contacts 76, 82 are formed from the substrate 70 and are disposed in and/or extend through openings, gaps and/or recesses therein. For example, the positive contacts 74, 76 and the negative contacts 76, 82 may be disposed in and/or extend through enlarged irregular-shaped openings 78. Portions of the substrates 70 of the upper and lower interconnect panels 58, 60 located toward a first side thereof have been removed such that the openings 78 are not fully circumscribed by edges of the substrates 70. The openings 78 in the upper and lower interconnect panels 58, 60 are aligned with the openings 68 in the insulating layers 64. The number of openings 78 in the upper and lower interconnect panels 58, 60 is equal to the number of battery cells 14.

Each positive contact 74, 80 has a pad portion 74a, 80a and a connector portion 74b, 80b that connects the pad portion 74a, 80a to the remainder of the substrate 70. In some embodiments, including the first embodiment, the connector portion 74b, 80b is thicker than the pad portion 74a, 80a. The positive contact 74, 80 forms a peninsula that extends into and/or through its associated opening 78. The pad portion 74a, 80a may be may be wider than the connector portion 74b, 80b, with the latter functioning as a fuse. In the shown embodiment, however, the pad portion 74a, 80a and the connector portion 74b, 80b have about the same width so as to appear (in a top plan view) as a single substantially rectangular strip with a rounded outer end.

Similar to the positive contacts 74, 80, each negative contact 76, 82 has a pad portion 76a, 82a and a connector portion 76, 82b that connects the pad portion 76a, 82a o the remainder of the substrate 70. In some embodiments, including the first embodiment, the pad portion 76a, 82a is thinner than the connector portion 76b, 82b. The negative contact 76, 82 forms a peninsula that extends into and/or through its associated opening 78. In some embodiments, the pad portion 76a, 82a may be wider than the connector portion 76b, 82b, with the latter functioning as a fuse. In other embodiments, such as the shown embodiment, the pad portion 76a, 82a and the connector portion 76b, 82b may have a similar configuration so as to appear as a single substantially rectangular strip with a rounded outer end, such as in the shown embodiment. In the shown embodiments, the negative contacts 76, 80 are narrower than the positive contacts 74, 80.

In the upper interconnect panel 58, bends may be formed in the connector portions 74b, 76b during the stamping operation to permit the pad portions 74a, 76a to be disposed below the substrate 70 where they are secured to the positive and negative terminals 52, 54 of the battery cells 14, respectively. In the lower interconnect panel 60, the connector portions 80b, 82b may simply slope or curve into the pad portions 82a, 82a. By pre-forming the bends in the connector portions 74b, 76b during the stamping operations, bends do not have to be formed at the same time that the pad portions 74a, 76a are being attached (by welding or otherwise) to the terminals 52, 54 of the battery cells 14.

In both the upper and lower interconnect panels 58, 60, the pad portions 74a, 76a, 80a, 80b of the positive and negative contacts may be thinner than the connector portions 74b, 76b, 80b, 82b of the positive and negative contacts, as shown in FIGS. 7 and 8. The pad portions 74a, 76a, 80a, 80a may be thinned, for example, by coining, milling or other means.

In the embodiments where the upper and lower interconnect panels 58, 60 each have separate sections, each section may include a plurality of the positive contacts 74, 80 and a plurality of the negative contacts 76, 82.

The upper and lower interconnect panels 58, 60 are configured for connecting together the battery cells 14 in a desired circuit arrangement for the first battery module 10. The circuit arrangement may have the battery cells 14 connected together in series, parallel and/or combinations thereof. For example, a plurality of groups of battery cells 14 may be electrically connected in series, wherein in each group, the battery cells 14 are electrically connected in parallel.

Figure 9:
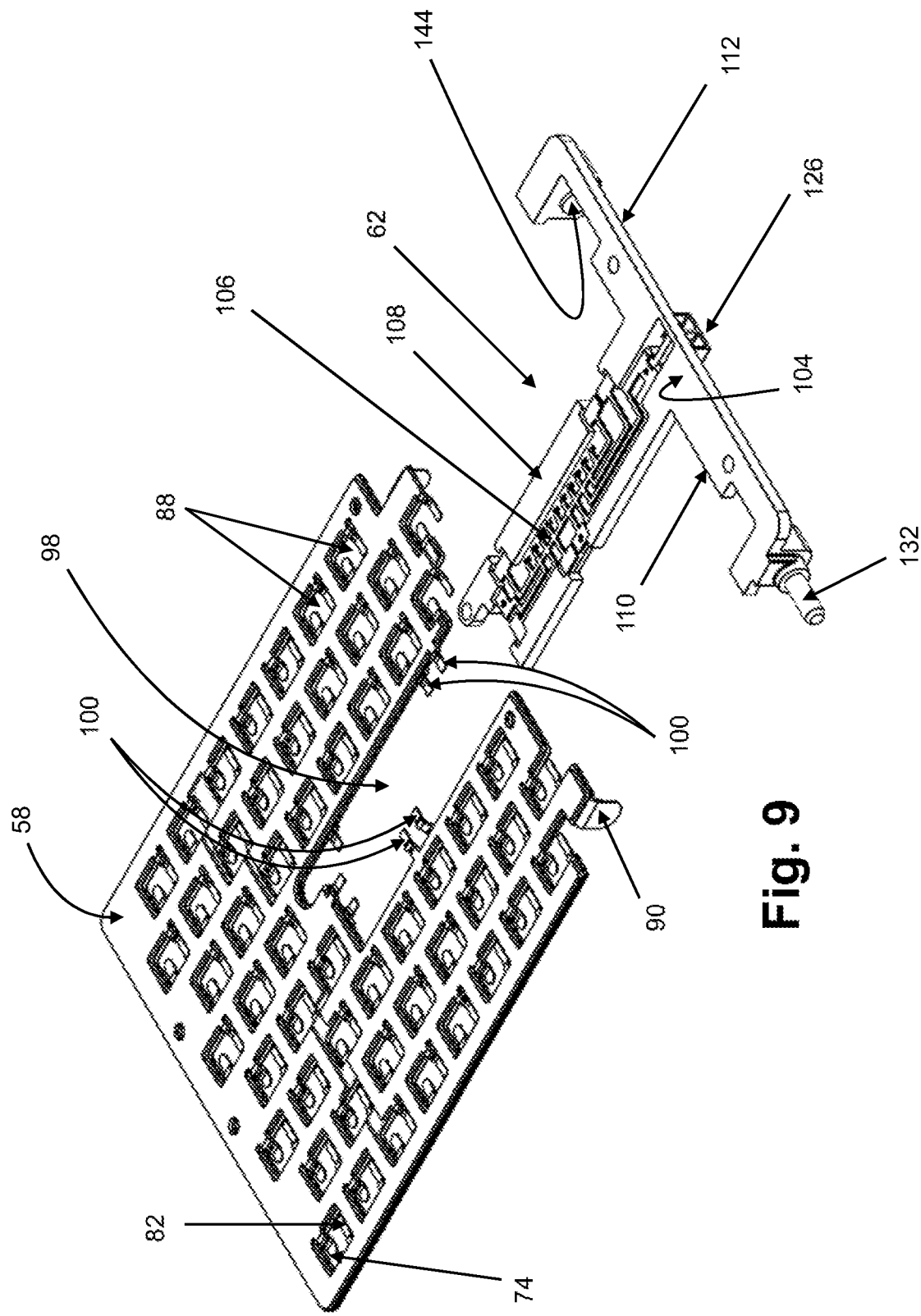
FIG. 9 shows a top perspective view of a first battery interconnect system of the first battery module, with a carrier of the first battery interconnect system moved out of position.

In order to make the electrical connections between battery cells 14, a given battery cell 14 may have one of its terminals 52, 54 connected to the upper interconnect panel 58 and the other one of its terminals 52,54 connected to the lower interconnect panel 60. This type of connection is illustrated in the shown embodiments, wherein the upper and lower interconnect panels 58,60 are configured to have the openings 78 in the upper interconnect panel 58 correspond with the openings 78 in the lower interconnect panel 60 such that in each opening 78 in the upper interconnect panel 58 having a positive contact 74, the corresponding opening 78 in the lower interconnect panel 60 has a negative contact 82, and vice versa. In addition, openings 68 in the insulating layers 64 are aligned with the corresponding openings 78 in the upper and lower interconnect panels 58, 60 so as to form openings 88 (shown in FIG. 9) in the first BIS 16, which are associated with the battery cells 14, respectively.

Figure 10:
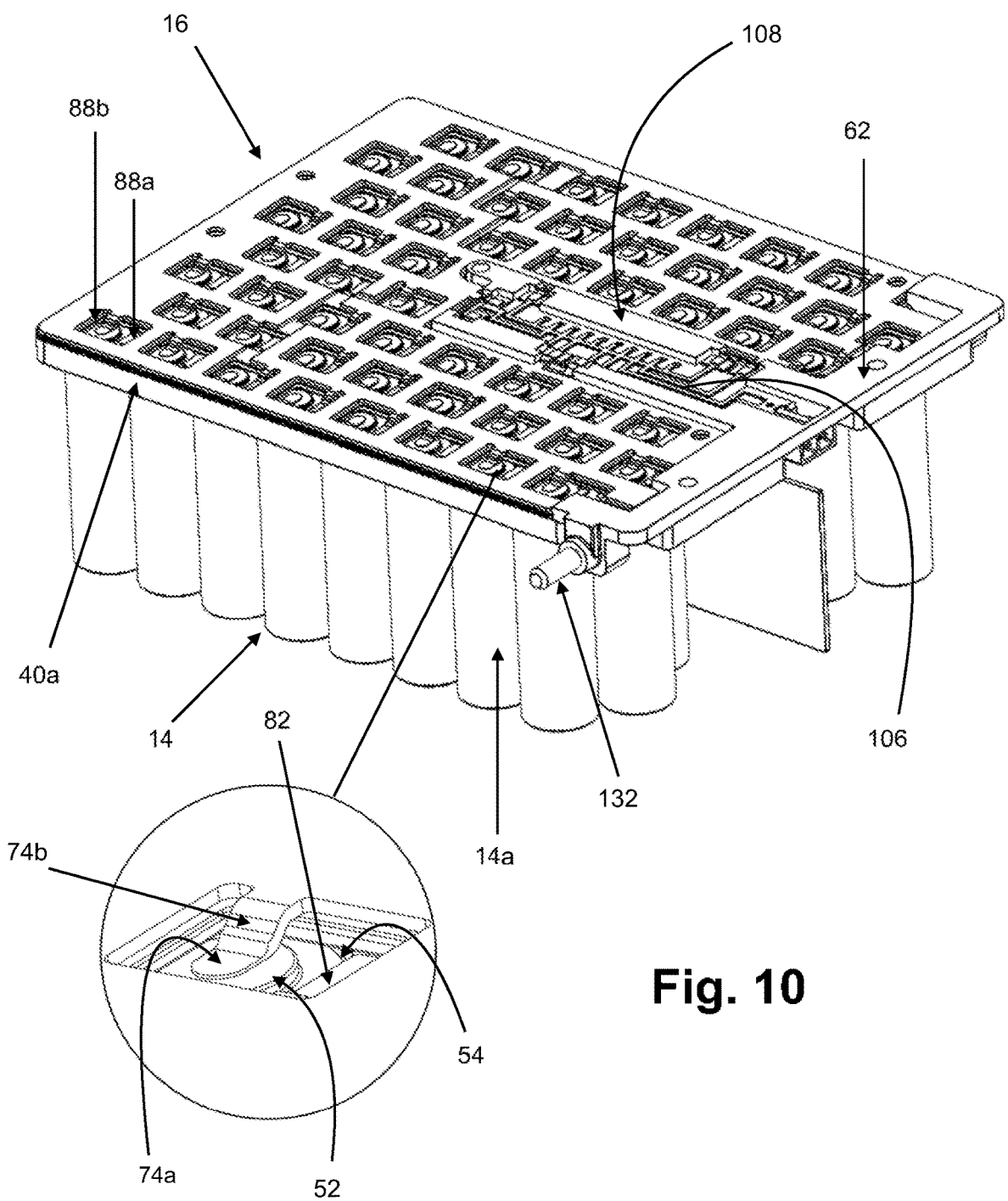
FIG. 10 shows a top perspective view of the first battery module with its housing removed.
Figure 11:
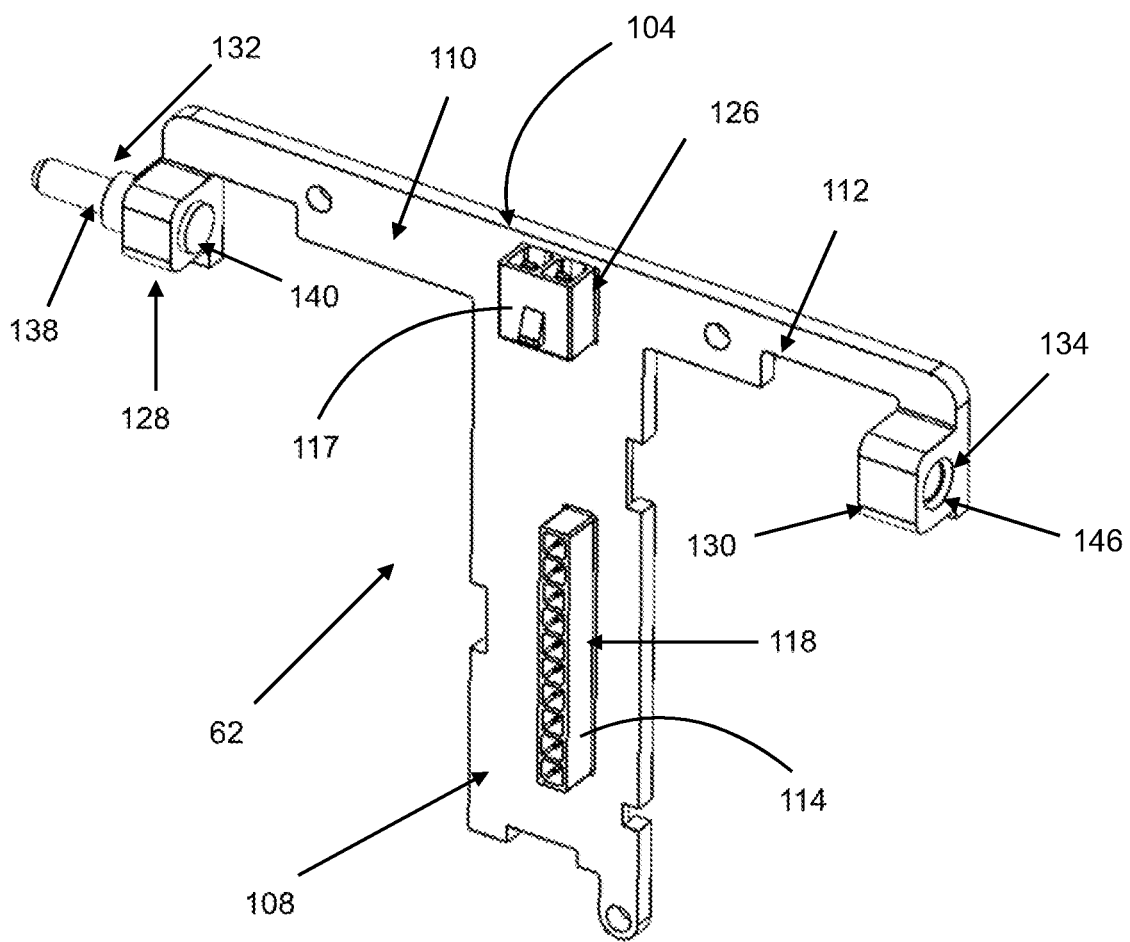
FIG. 11 shows a bottom perspective view of the carrier shown in FIG. 9.
Figure 12:
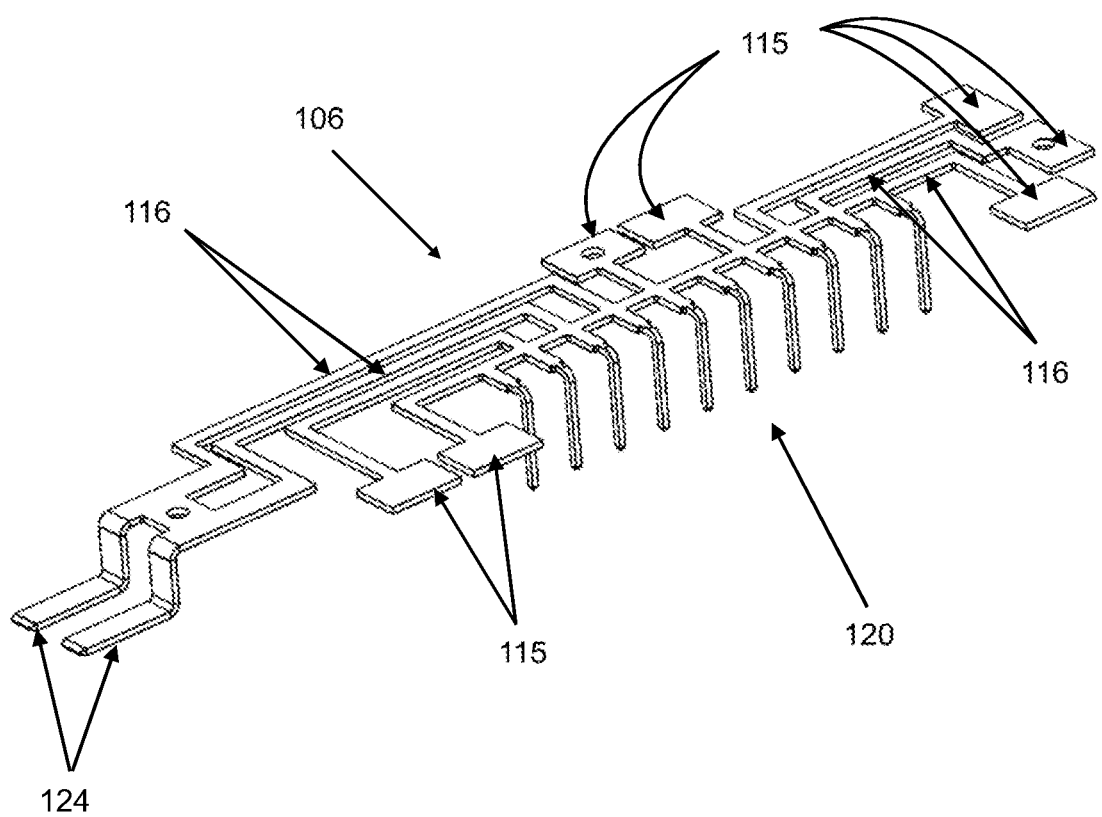
FIG. 12 shows a top perspective view of a lead frame of the carrier shown in FIG. 9 and in FIG. 11.

Referring now to FIG. 10, each battery cell 14 is associated with an opening 88 in the first BIS 16 and an opening 44 in the upper cell holder 40a. Each battery cell 14 extends into an opening 44 of the upper cell holder 40a such that an upper portion of the battery cell 14 is surrounded by the interior surface of the substrate 42 defining the opening 44. Top surfaces of the center positive terminals 52 and the surrounding annular negative terminals 54 of the battery cells 14 are disposed about flush with a top surface of the upper cell holder 40. With regard to each battery cell 14, the positive terminal 52 of the battery cell 14 is connected to a positive contact 74, 80 of one of the upper and lower interconnect panels 58,60 and the negative terminal 54 of the battery cell 14 is connected to a negative contact 76, 82 of the other one of the upper and lower interconnect panels 58,60. For example, battery cell 14a has its positive terminal 52 connected to a positive contact 74 of the upper interconnect panel 58 and its negative terminal 54 connected to a negative contact 82 of the lower interconnect panel 60. As shown, the connector portion 74b of the positive contact 74 is bent downward, over the upper insulating layer 64a and the lower interconnect panel 60 to place the pad portion 74a of the positive contact 74 in physical contact with the positive terminal 52, where they are secured together. The terminals 52, 54 of the battery cells 14 may be connected to the contact pads 74, 76, 80, 82 of the upper and lower interconnect panels 58, 60 by electron beam welding or laser beam welding.

In order to facilitate the connection of the terminals 52, 54 of the battery cells 14 to the upper and lower interconnect panels 58, 60, the contacts 74, 76, 80, 82 are arranged in the openings 88 in the first BIS 16 such that in each opening 88, the negative contact 76, 82 is disposed toward a first side portion 88a of the opening 88, while the positive contact 74, 80 is disposed toward an opposing second side portion 88b of the opening 88. In the lower interconnect panel 60, both the positive and negative contacts 80, 82 extend into the openings 88 from first (front) edges 70a of the substrate 70 of the lower interconnect panel 60, respectively, whereas, in the upper interconnect panel 58, both the positive and negative contacts 74, 76 extend into the openings 88 from second (posterior) edges 70b of the substrate 70 of the upper interconnect panel 58, respectively, with the first edges 70a and the second edges 70b being disposed on opposing sides of the openings 88.

The lower interconnect panel 60 includes first (front) and second (posterior) power tabs 90, 92 disposed on opposite sides of the lower interconnect panel 60. The first and second power tabs 90, 92 are bent downward and, thus, are disposed out-of-plane with the rest of the substrate 70. Planar surfaces of the first and second power tabs 90, 92 face outward and are disposed at about a right angle to the substrate 70. The first and second power tabs 90, 92 are positive and negative contacts for the circuit arrangement of the first battery module 10. As will be described more fully below, the first and second power tabs 90, 92 are electrically connected to the carrier 62.

In the shown embodiments, the upper and lower interconnect panels 58, 60 and the insulating layers 64 have enlarged slots 94, 96 formed therein, respectively, which correspond to the enlarged slots 46 in the cell holders 40. The slots 94, 96 are aligned so as to form a slot 98 (shown in FIG. 9) for receiving the carrier 62. A plurality of sensing contacts 100 extend from each of the upper and lower interconnect panels 58, 60 and project into the slot 98. The sensing contacts 100 enable various measurements (such as current, voltage and temperature) to be made by the monitoring module 15 of various portions of the circuit arrangement for the first battery module 10. For example, the voltages and/or temperatures at the outputs of groups of parallel-connected battery cells 14 may be measured by the monitoring module 15 at the sensing contacts 100, respectively.

Referring now to FIGS. 9 and 11-14, the carrier 62 includes a plastic body 104 and a stamped lead frame 106 composed of conductive metal, such as copper. The body 104 is formed by overmolding the lead frame 106 with a thermoplastic resin. Preferably, the thermoplastic resin has good electrical insulating properties and is heat resistant. Examples of thermoplastic resins that may be used include polypropylene, polyphenylene ether, polyamide, polyester, polyphenylene sulfide, liquid crystal polymer, polystyrene, polycarbonate and polybutylene terephthalate. Particularly suitable commercially-available thermoplastics include syndiotactic polystyrene (SPS) with glass or carbon fiber, which is commercially available from Indemitsu Kosan Co., Ltd., under the brand Xarec®; and a blend of polyphenylene oxide (PPO) and polystyrene (PS), which is commercially available from SABIC Innovative Plastics under the brand Noryl®.

Figure 14:
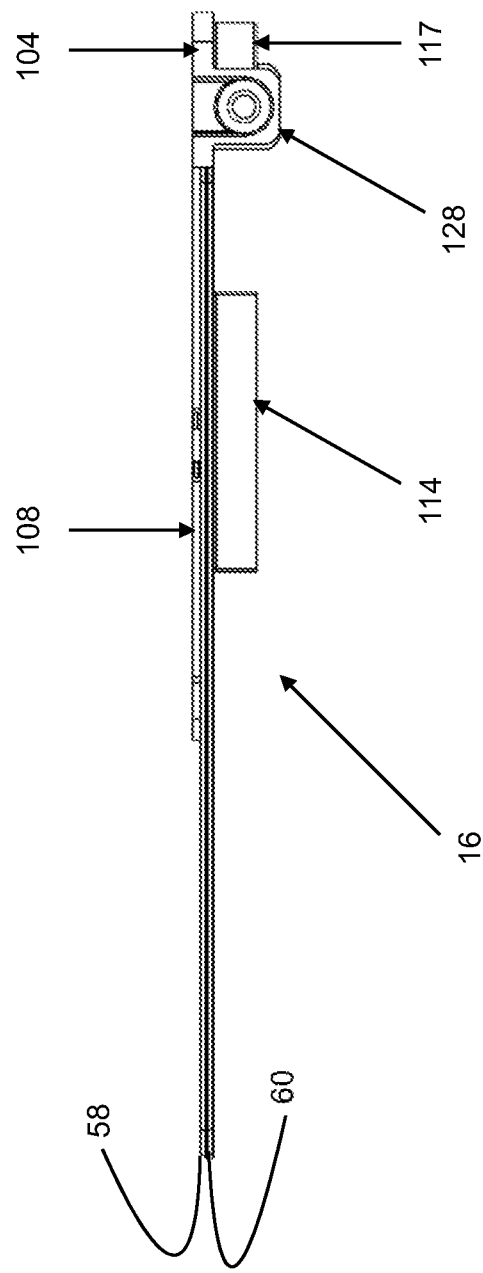
FIG. 14 shows a front elevational view of the first battery interconnect system of the first battery module.

The body 104 of the carrier 62 is generally T-shaped and includes a bar-shaped main portion 108 joined to a pair of outwardly-extending first and second arm portions 110, 112. The main portion 108 fits into the slot 98 of the first BIS 16, while the arm portions 110,112 help form a first side edge of the first BIS 16. A first connector housing 114 is joined to a bottom side of the main portion 108 and has a plurality of openings facing downward, toward the inner chamber 38 of the housing body 18. A second connector housing 117 is also joined to a bottom side of the main portion 108 and has a pair of openings that face outward. As best shown in FIG. 14, a portion (e.g., the main portion 108) of the carrier body 104 is disposed above the upper interconnect panel 58 and a portion (e.g., the connector housing 114) of the carrier body 104 is disposed below the lower interconnect panel 60.

Figure 13:
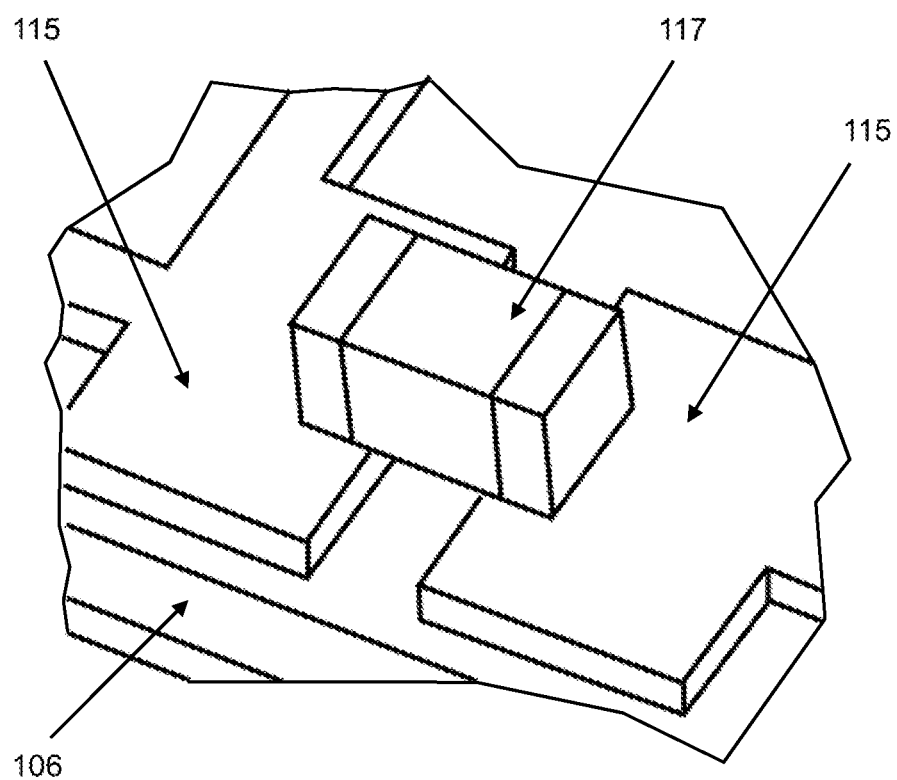
FIG. 13 shows a close-up top perspective view of a portion of the lead frame of FIG. 12, showing a component secured between pads of the lead frame.

The lead frame 106 is molded into the main portion 108. An upper portion of the lead frame 106 may be mostly exposed, as shown, or may be completely covered with polymer of the body 104, except for the pads 115, which are exposed either way and are disposed in recesses spaced inward from side edges of the main portion 108. The pads 115 are electrically and mechanically connected to the sensing contacts 100 of the upper and lower interconnect panels 58, 60, respectively, such as by electron beam welding or laser beam welding. Components 117, such as fuses and/or thermistors, may also be welded between the pads 115, as shown in FIG. 13. The pads 115 are connected by leads 116 to connector pins 120, most of which are arranged in a row or matrix that projects downward into the first connector housing 114 to form a female connector 118, which couples with a connector 122 of the monitoring module 15. Some of the connector pins 120, however, are connected to connector blades 124 that extend into the second connector housing 117 to form a connector 126, which may be used for connecting the monitoring module 15 to a master controller for the vehicle battery system. The connector 126 is accessible through the opening 27 in the exterior wall 24c of the housing body 18.

The first and second arm portions 110,112 include downwardly-extending first and second mounts 128,130, respectively. A first power connector 132 is molded into the first mount 128 of the first arm portion 110, while a second power connector 134 is molded into the second mount 130 of the second arm portion 112. The first and second power connectors 132,134 permit a plurality of the battery modules 10 to be connected together. The first and second power connectors 132,134 are electrically isolated from the lead frame 106 by the insulating plastic of the carrier body 104.

The first power connector 132 is pin-shaped and includes a solid cylindrical body 138 joined to an enlarged circular head 140. The body 138 extends from an outer side of the first mount 128, while the head 140 is disposed against an inner side of the first mount 128. The head 140 may be physically and electrically connected to the first power tab 90 of the lower interconnect panel 60, such as by electron beam welding or laser beam welding.

The second power connector 134 includes a hollow cylindrical body joined to an enlarged circular head 144. An open end of the body forms a socket 146, which is disposed adjacent to an outer side of the second mount 130, while the head 144 is disposed against an inner side of the second mount 130. The head 144 may be physically and electrically connected to the second power tab 92 of the lower interconnect panel 60, such as by electron beam welding or laser beam welding.

The body 138 of the first power connector 132 extends through the slot 28 in the exterior wall 24a of the housing body 18, while the socket 146 of the second power connector 134 is aligned with the hole 29 in the exterior wall 24b. The body 138 of the first power connector 132 is sized to be received in the socket 146 of the second power connector 134. In this manner, a first battery module 10 can be electrically connected to a second first battery module 10 by inserting the body 138 of the first power connector 132 of the first battery module 10 into the socket 146 of the second power connector 134 of the second first battery module 10.

The carrier 62, together with the other components of the first BIS 16 are supported on the upper cell holder 40a, which, in turn, is supported on the interior flange 32 of the housing body 18. The posts 34 of the housing body 18 may extend through aligned openings in the upper cell holder 40a and the BIS 16 to help secure and maintain the alignment of these components within the housing body 18. With the first BIS 16 so positioned, the main portion 108 of the carrier 62 is positioned over the inner chamber 38 of the housing body 18 such that the connector 118 of the carrier 62 extends into the inner chamber 38, where it is connected to the connector 122 of the monitoring module 15.

Figure 15:
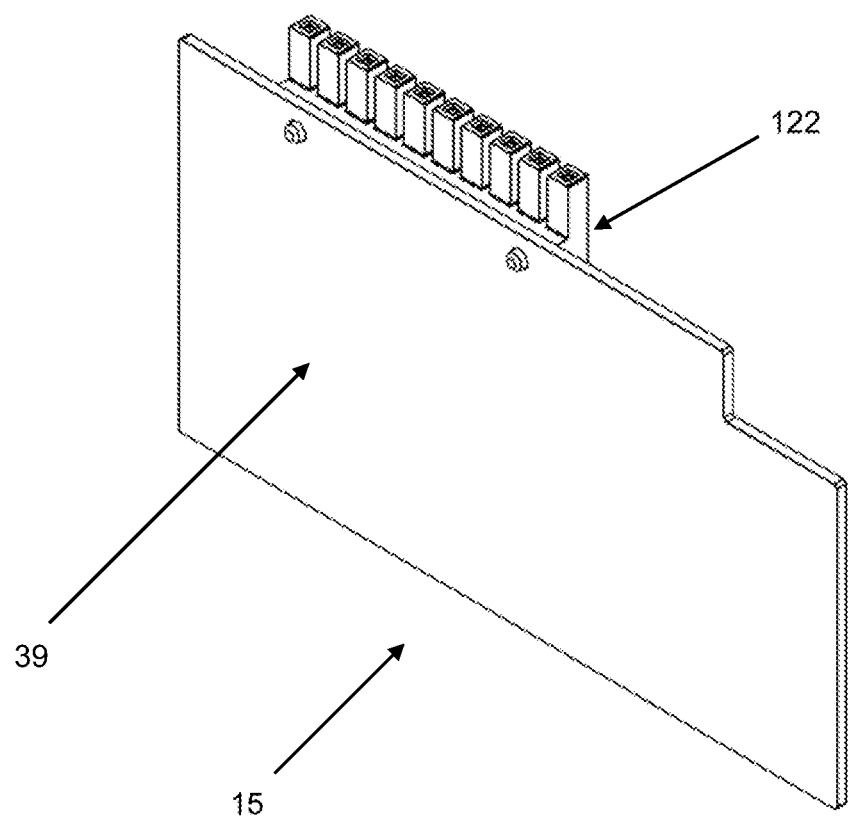
FIG. 15 shows a perspective view of a monitoring module of the first and second battery modules.
Figure 16:
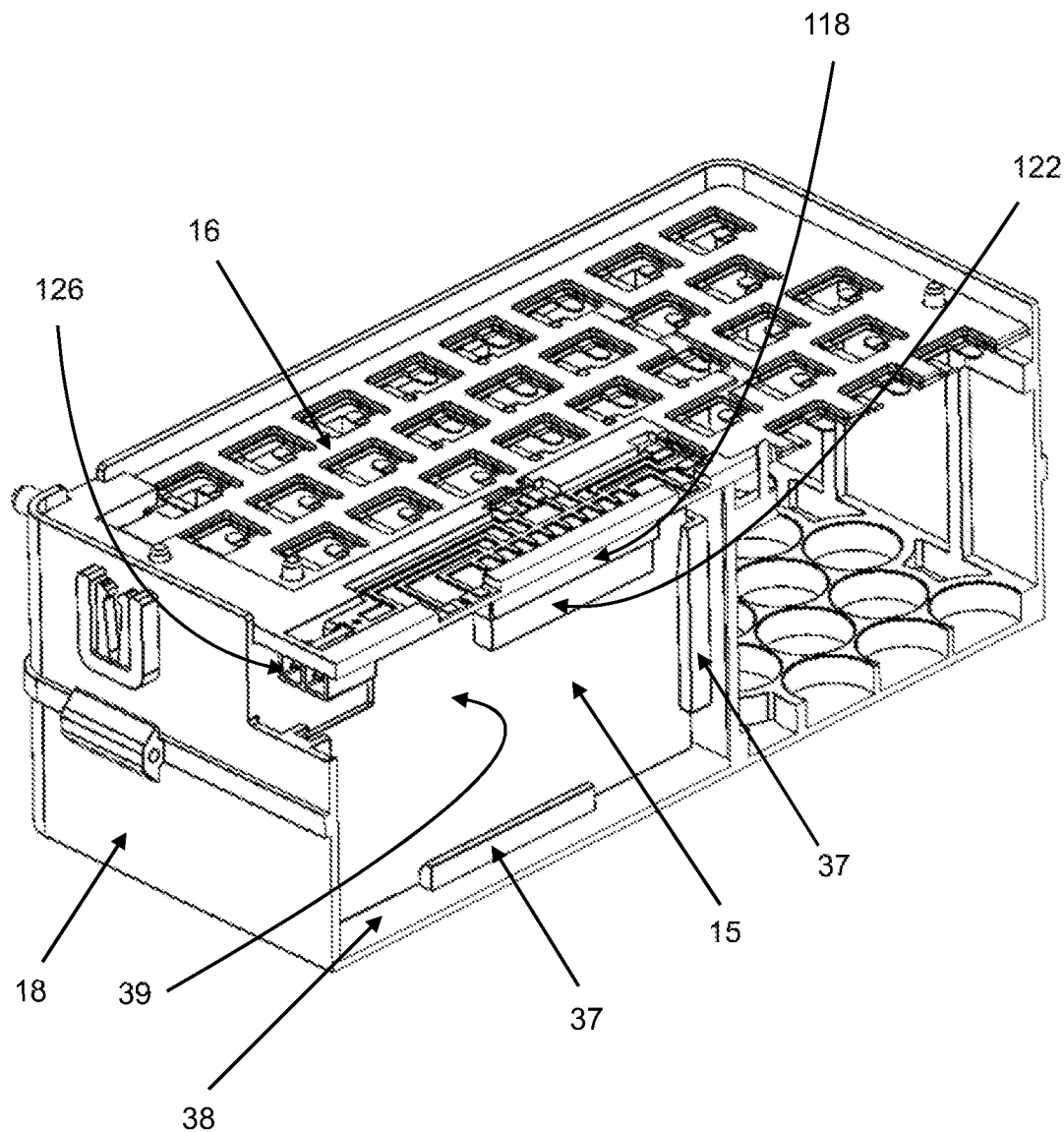
FIG. 16 shows a perspective sectional view of the first battery module with its housing lid and battery cells removed.

Referring now to FIGS. 15 and 16, the monitoring module 15 includes the PCB 39, which has the connector 122 secured thereto. The connector 122 fits into the connector 118 of the carrier 62 to establish an electrical connection between the PCB 39 and the lead frame 106. The PCB 39 has monitoring circuitry that may include one or more processors and memory. The one or more processors may include one or more application specific integrated circuits (ASICs), one or more field programmable gate arrays (FPGAs), one or more general purpose processors, or any combination thereof. The memory may include volatile memory, such as random access memory (RAM), and/or non-volatile memory, such as read-only memory (ROM).

The monitoring module 15 is operable to monitor the operation of the first battery module 10. For example, the monitoring circuitry may monitor the voltage across each battery cell 14 and/or each group of battery cells 14. In addition, the monitoring circuitry may monitor the current flowing into or out of the first battery module 10 through the first and second power connectors 132,134. Further, the monitoring circuitry may monitor temperatures at various locations within the first battery module 10. If any of the monitored voltages, currents or temperatures exceed a predetermined level, the monitoring circuitry may generate an alarm to notify the master controller for the vehicle battery system. Values for the monitored voltages, currents and temperatures, as well as any generated alarms may be transmitted to the master controller over a Controller Area Network (CAN) bus connected between the monitoring module 15 and the master controller.

As shown in FIG. 16, the monitoring module 15 is disposed in the inner chamber 38 of the housing body 18, with the PCB 39 held in the slots of the mounts 37. The connectors 118, 122 are coupled together, with the socket contacts of the connector 122 receiving the connector pins 120 of the connector 18, thereby making a connection between the sensing contacts 100 of the first BIS 16 and the monitoring circuitry of the monitoring module 15.

Figure 17:
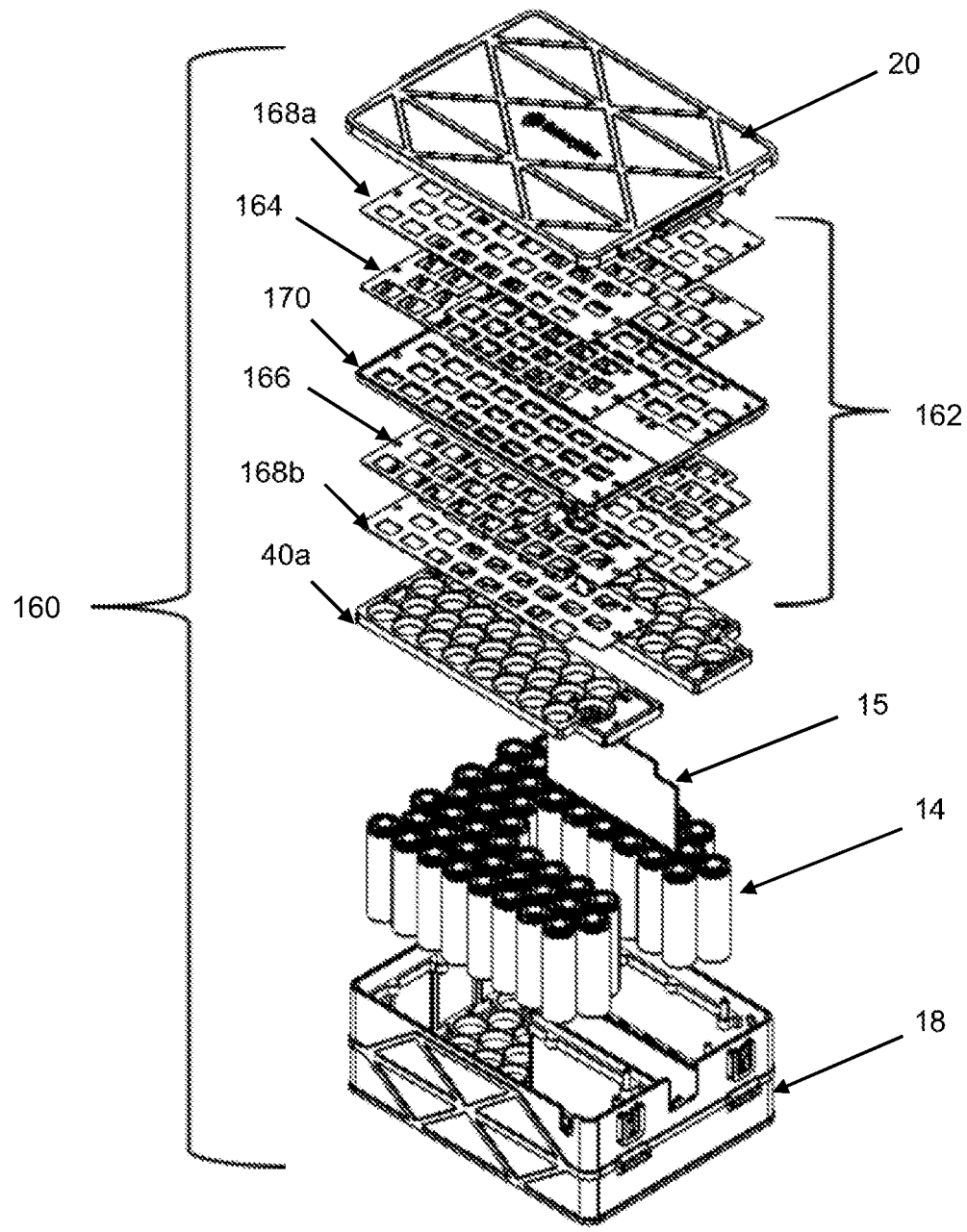
FIG. 17 shows an exploded perspective view of the second battery module, which is constructed in accordance with a second embodiment of the disclosure.

Referring now to FIG. 17, there is shown the second battery module 160, which is constructed in accordance with a second embodiment of the disclosure. The second battery module 160 has the same construction as the first battery module 10, except the second battery module 160 has the second BIS 162, instead of the first BIS 16.

The second BIS 162 has the same construction as, and interconnects the battery cells 14 in the same manner as, the first BIS 16, except for the differences described below. The second BIS 162 generally includes a top interconnect layer or panel 164, a bottom interconnect layer or panel 166 and a carrier 170. The second BIS 162 may further include one or more electrical insulating layers 168. For example, the second BIS 162 may include an upper insulating layer 168a and a lower insulating layer 168b, as is shown in FIG. 17. The insulating layers 168 have the same construction as the insulating layers 64, except the insulating layers 168 do not have side portions removed like the insulating layers 64. As such, all of the openings 68 in the insulating layers 168 are fully circumscribed by interior edges of the layers 168.

As with the lower insulating layer 64b in the first BIS 16, the lower insulating layer 168b of the second BIS 162 is disposed between the lower interconnect panel 166 and the upper cell holder 40a. However, unlike the upper insulating layer 64a of the first BIS 16, the upper insulating layer 168a of the second BIS 162 is disposed between the lid 20 and the upper interconnect panel 164. The upper insulating layer 168a may be secured to a top side of the upper interconnect panel 164 by adhesive, and the bottom insulating layer 168b may be secured to a bottom side of the bottom interconnect panel 166 by adhesive. Alternately, the upper and lower interconnect panels 164,166, the carrier 170 and the insulating layers 168 may all be secured together by physical connectors to make the second BIS 162 an integral assembly. In some embodiments, the upper cell holder 40a may also be secured to the second BIS 162 by the same or different connectors.

Figure 18:
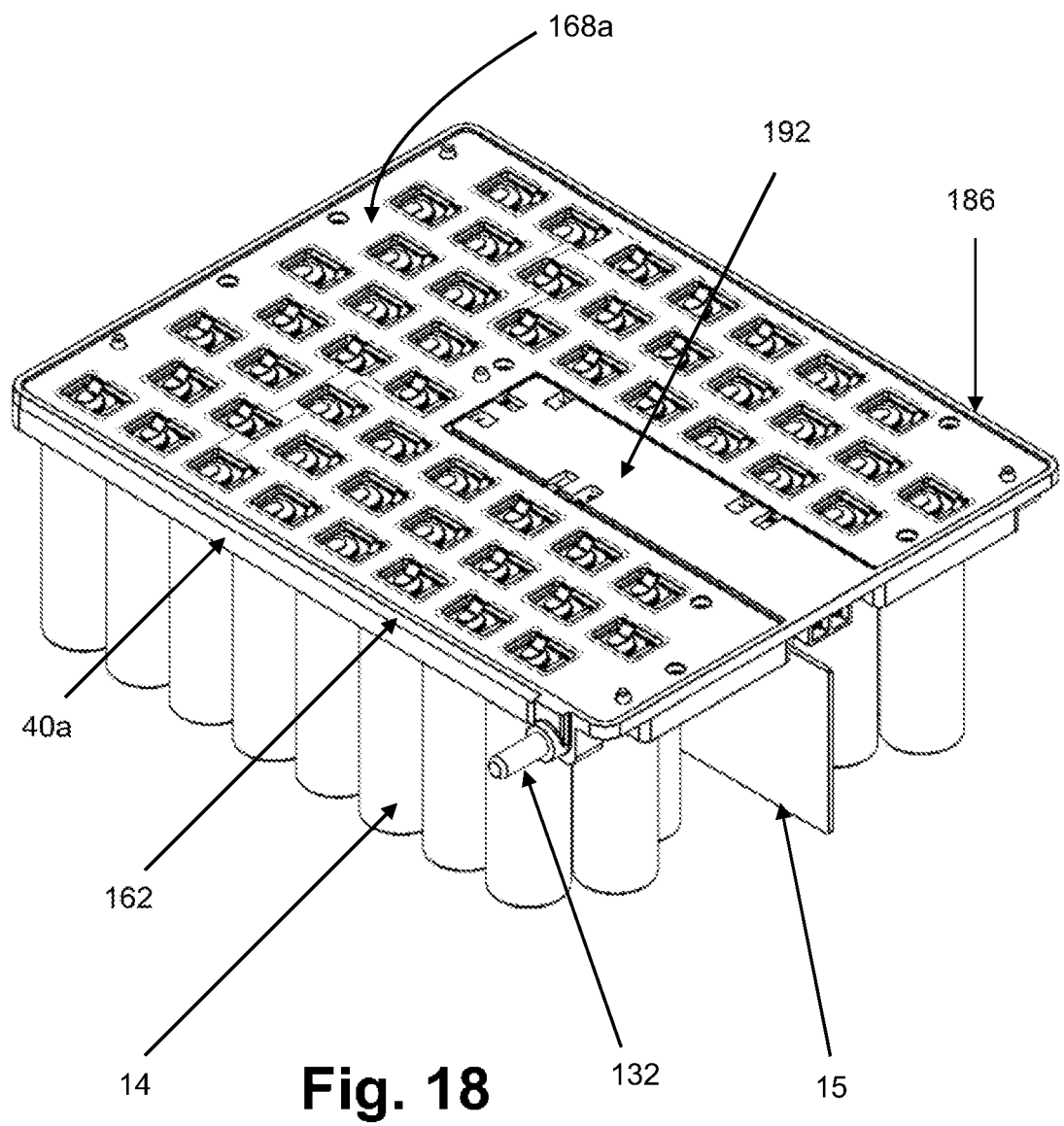
FIG. 18 shows a top perspective view of the second battery module with its housing removed.

As shown in FIG. 18, the second BIS 162 is disposed on top of the upper cell holder 40a and the battery cells 14. As with the first BIS 16 of the first battery module 10, the second BIS 162 connects together the battery cells 14 in a desired circuit arrangement for the second battery module 160. The circuit arrangement may have the battery cells 14 connected together in series, parallel and/or combinations thereof. For example, a plurality of groups of battery cells 14 may be electrically connected in series, wherein in each group, the battery cells 14 are electrically connected in parallel.

Figure 19:
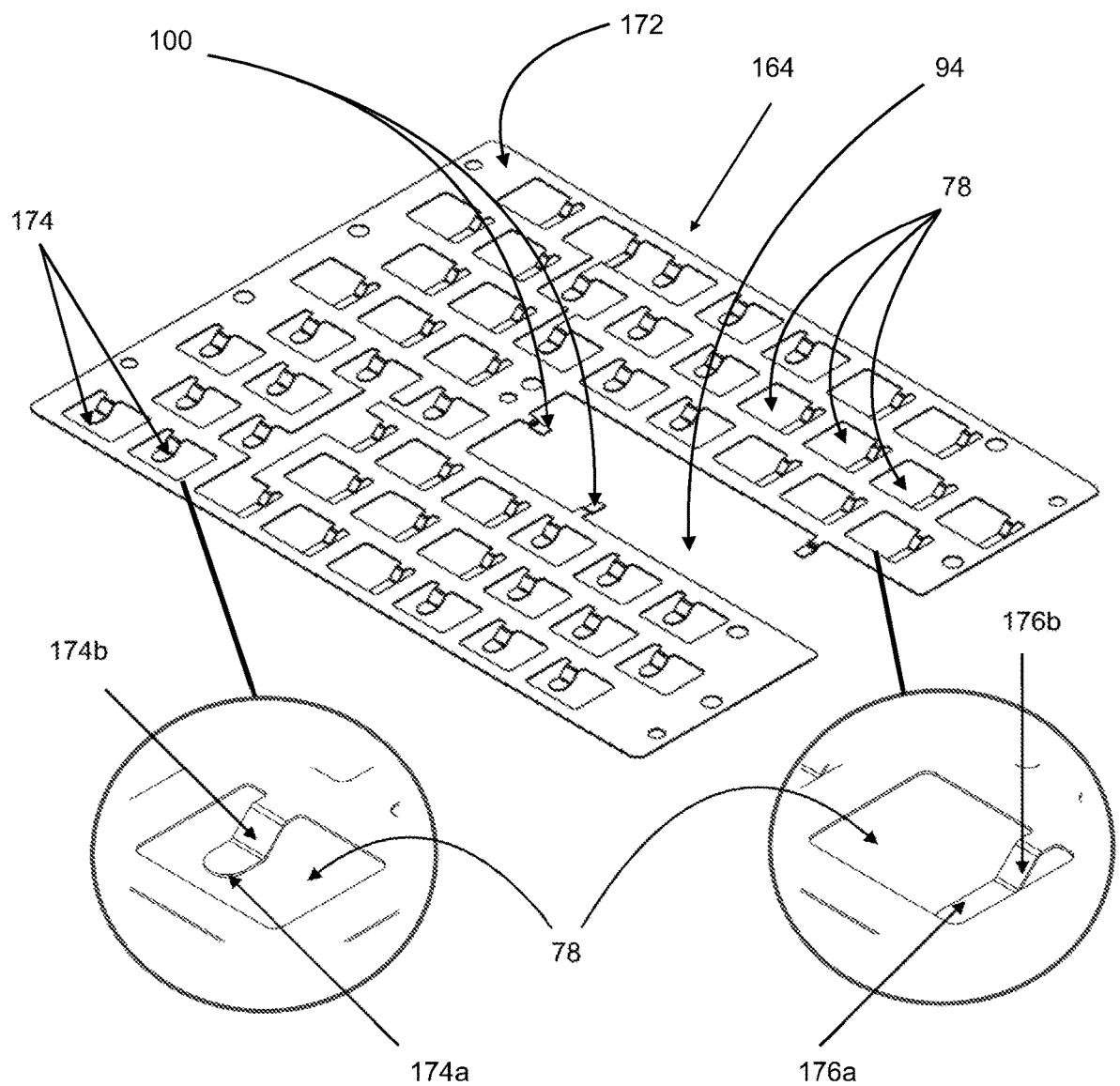
FIG. 19 shows a top perspective view of an upper interconnect panel of the second battery module.
Figure 20:
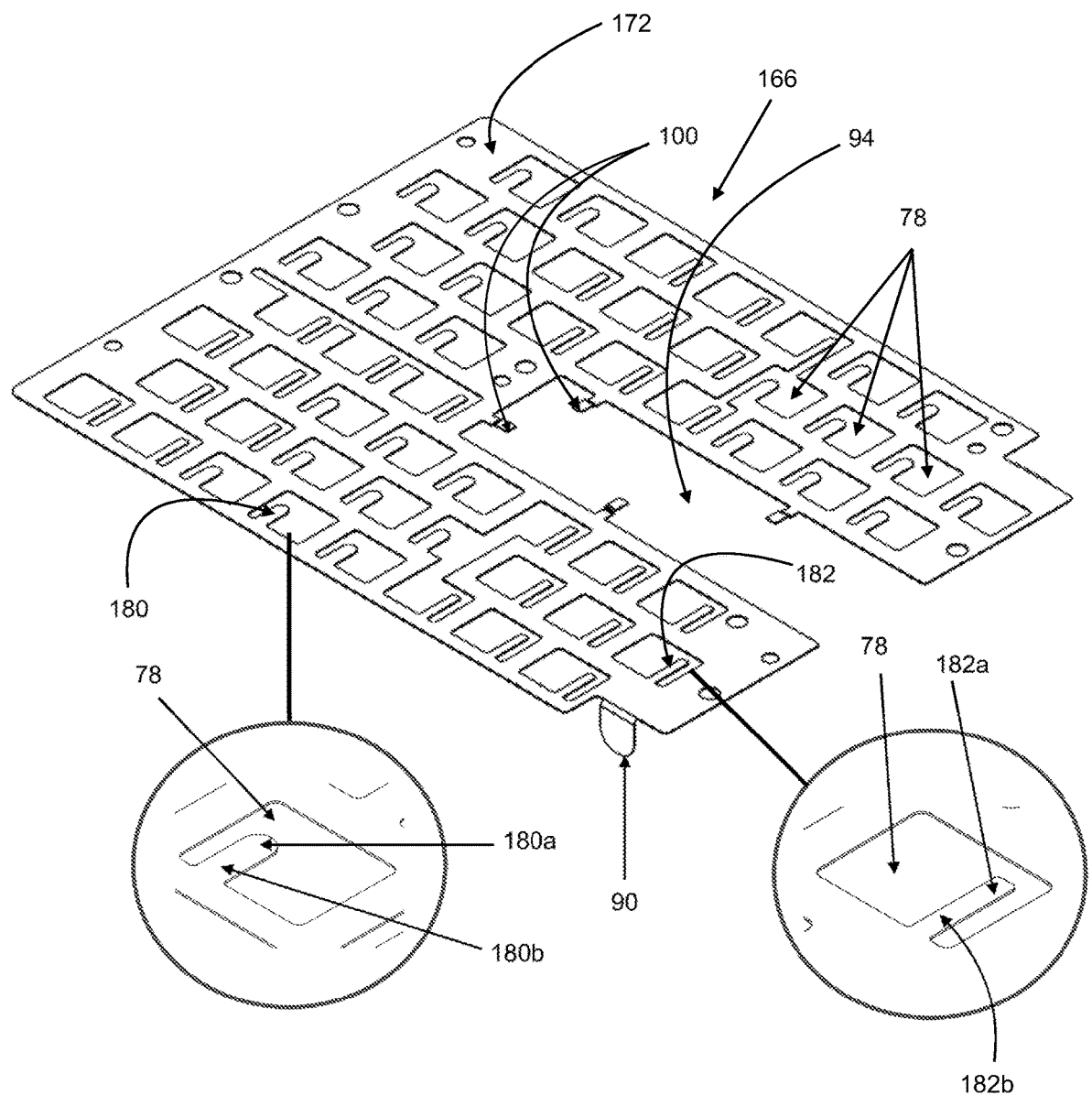
FIG. 20 shows a top perspective view of a lower interconnect panel of the second battery module.
Figure 21:
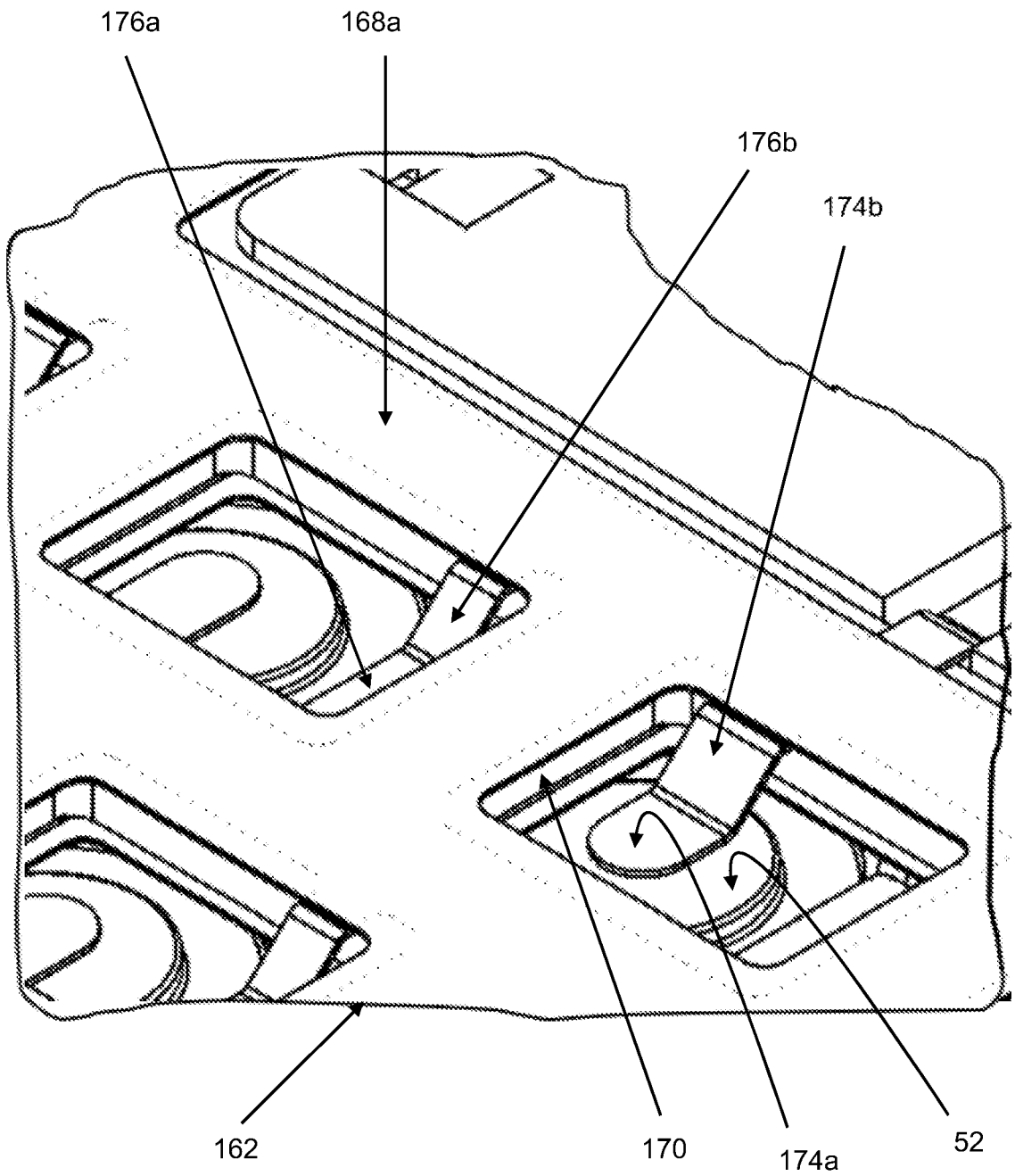
FIG. 21 shows a close-up view of a portion of FIG. 18.

Referring now also to FIGS. 19-21, the upper and lower interconnect panels 164, 166 are generally rectangular and are composed of a substrate 172 of conductive metal, such as aluminum, an aluminum alloy, copper, or a copper alloy. Each of the upper and lower interconnect panels 164, 166 is formed in a stamping operation from a sheet of the conductive metal. The second embodiment is especially suited to having the upper and lower interconnect panels 164, 166 being composed of copper, with the substrate 172 having a thickness of from about 0.005 inches (0.127 mm) to about 0.020 inches (0.508 mm) and more preferably about 0.010 inches (0.254 mm). The upper and lower interconnect panels 164, 166 may each be one unitary or monolithic structure, or may comprise a plurality of sections separated from each other by gaps or spaces, which may be formed by severing sacrificial tie bars.

Except as noted above and below, the upper and lower interconnect panels 164, 166 of the second BIS 162 have the same construction as the upper and lower interconnect panels 58, 60 of the first BIS 16. Unlike the upper and lower interconnect panels 58, 60 of the first BIS 16, the upper and lower interconnect panels 164, 166 do not have side portions removed. Thus, all of the openings 78 are fully circumscribed by edges of the substrates 172.

As best shown in FIG. 19, the substrate 172 of the upper interconnect panel 164 is thinner than the substrate 70 of the upper interconnect panel 58. In addition, the upper interconnect panel 164 has a plurality of positive contacts 174, instead of positive contacts 74, and a plurality of negative contacts 176, instead of negative contacts 76. The positive and negative contacts 174, 176, however, are similarly constructed and arranged as the positive and negative contacts 74, 76 of the upper interconnect panel 58, with the difference therebetween being described below. The positive contacts 174 each have a pad portion 174a and a connector portion 174b, and the negative contacts 176 each have a pad portion 176a and a connector portion 176b. The connector portions 174b, 176b are thinner than the connector portions 74b, 76b in the upper interconnect panel 58. The connector portions 174b,176b are about the same thickness as the pad portions 174a, 176a.

In addition to the foregoing, the bends in the connector portions 174b, 176b for the positive and negative contacts 174, 176 in the upper interconnect panel 164 are more pronounced (i.e., larger) than the bends in the connector portions 74b, 76b for the positive and negative contacts 74,76 of the upper interconnect panel 58. The bends are larger in order to allow the connector portions 174b, 176b to extend over the greater thickness of the carrier 170 to enable the pad portions 174a, 176a to be secured to the terminals 52, 54 of the battery cells 14, such as by electron beam welding or laser beam welding.

As best shown in FIG. 20, the substrate 172 of the lower interconnect panel 166 is thinner than the substrate 70 of the lower interconnect panel 60. In addition, the lower interconnect panel 166 has a plurality of positive contacts 180, instead of positive contacts 80, and a plurality of negative contacts 182, instead of negative contacts 82. The positive and negative contacts 180, 182, however, are similarly constructed and arranged as the positive and negative contacts 80, 82 of the lower interconnect panel 60, with the difference therebetween being described below. The positive contacts 180 each have a pad portion 180a and a connector portion 180b, and the negative contacts 182 each have a pad portion 182a and a connector portion 182b. The connector portions 180b, 182b are thinner than the connector portions 80b, 82b in the lower interconnect panel 60. The connector portions 180b, 182b are about the same thickness as the pad portions 180a, 182a such that the connector portions 180a, 182a are substantially flat and merge seamlessly with the pad portions 180a, 182a, respectively. As with the upper interconnect panel 164, the pad portions 180a, 182a of the lower interconnect panel 166 are secured to the terminals 52, 54 of the battery cells 14, such as by electron beam welding or laser beam welding.

Figure 22:
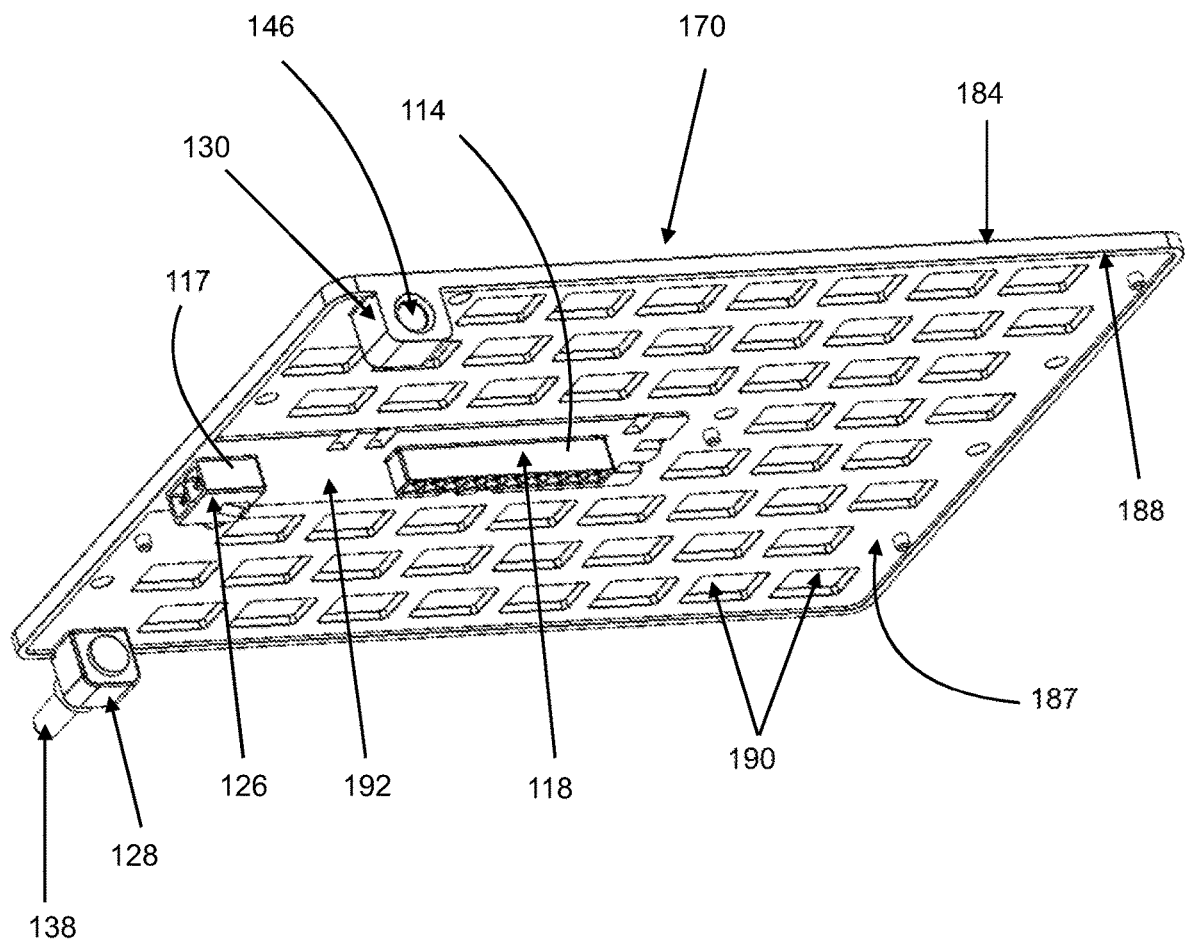
FIG. 22 shows a bottom perspective view of a carrier of the second battery module.
Figure 23:
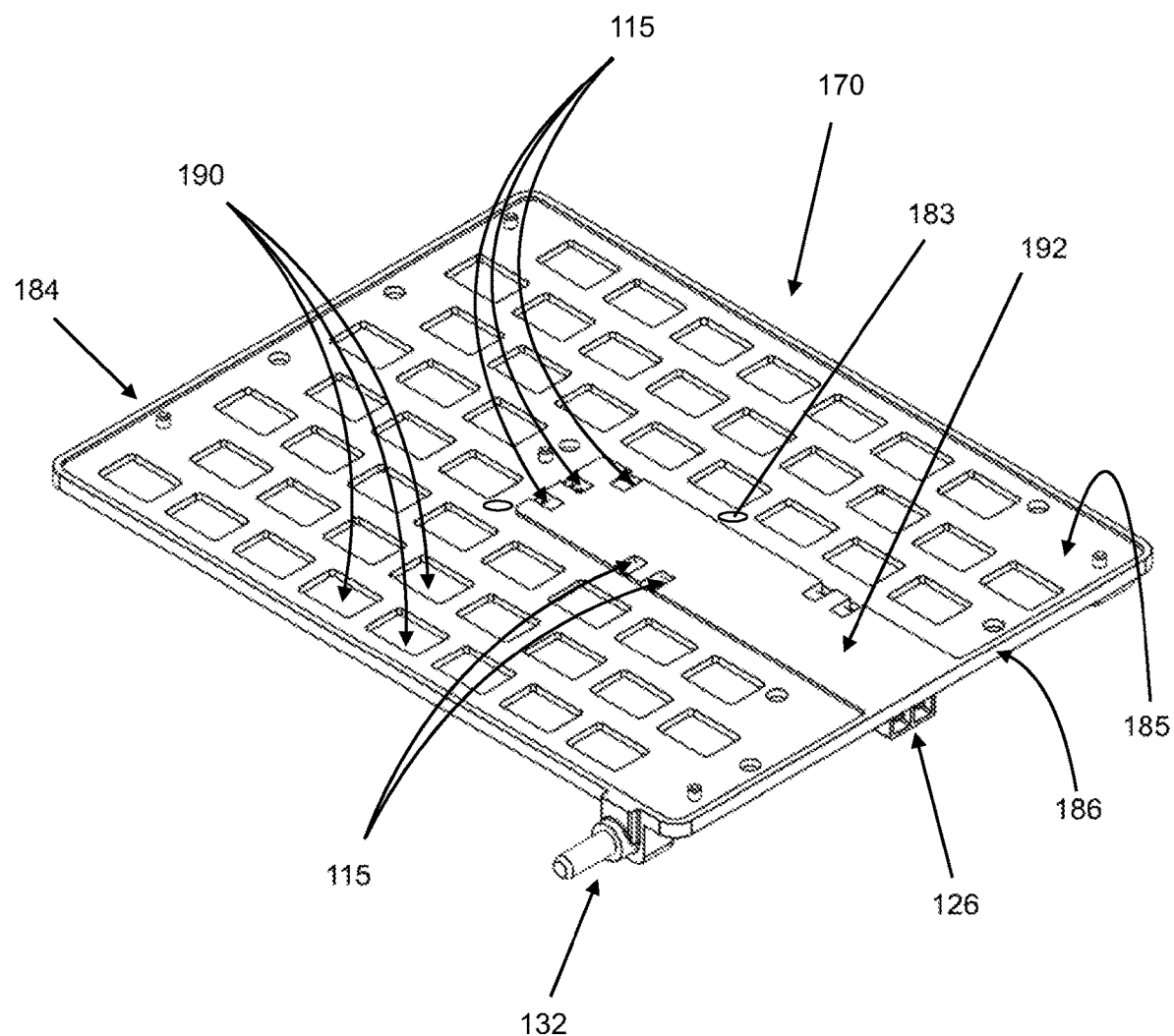
FIG. 23 shows a top perspective view of the carrier of the second battery module.

Referring now to FIGS. 22 and 23, the carrier 170 includes a plastic body 184 and the lead frame 106. The body 184 is formed by overmolding the lead frame 106 with a thermoplastic resin. Preferably, the thermoplastic resin has good electrical insulating properties and is heat resistant. Examples of thermoplastic resins that may be used include polypropylene, polyphenylene ether, polyamide, polyester, polyphenylene sulfide, liquid crystal polymer, polystyrene, polycarbonate and polybutylene terephthalate. Particularly suitable commercially-available thermoplastics include syndiotactic polystyrene (SPS) with glass or carbon fiber, which is commercially available from Indemitsu Kosan Co., Ltd., under the brand Xarec®; and a blend of polyphenylene oxide (PPO) and polystyrene (PS), which is commercially available from SABIC Innovative Plastics under the brand Noryl®.

The body 184 of the carrier 170 is rectangular in shape and has dimensions (length and width) slightly larger than the upper and lower interconnect panels 164,166 and the insulating layers 168. The body 184 has an upper surface 185 delimited by an overmold portion 192 and a peripheral upper flange 186. Similarly, the body 184 has a lower surface 187 delimited by the overmold portion 192 and a peripheral lower flange 188. The thickness of the body 184, between the upper and lower surfaces 185, 187, is from about 0.039 inches (1 mm) to about 0.188 inches (3 mm) and more preferably about 0.079 inches (2 mm). As such, the body 184 is from about 2 to about 24 times the thickness and more preferably about 6 to 8 times the thickness of each of the upper and lower interconnect panels 164,166. The body 184 has a plurality of enlarged rectangular openings 190 extending through the upper and lower surfaces 185,187, with the number of openings 190 being equal to the number of battery cells 14. The carrier 170 is disposed between the upper and lower interconnect panels 164,166 and adjoins them. More specifically, the upper interconnect panel 164 adjoins the upper surface 185 of the carrier body 184 and its outer edges are surrounded by the upper flange 186, while the lower interconnect panel 166 adjoins the lower surface 187 of the carrier body 184 and its outer edges are surrounded by the lower flange 188. The openings 190 in the carrier body 184 are aligned with the openings 78 in the upper and lower interconnect panels 164,166, as well as the openings 68 in the insulating layers 168 so as to form openings 194 in the second BIS 162 (shown best in FIG. 24). The upper flange 186 surrounds the outer edges of the first insulating layer 168a, while the lower flange 188 surrounds the outer edges of the second insulating layer 168b. The upper and lower flanges 186,188 help maintain the alignment of the upper and lower interconnect panels 164,166 and the insulating layers 168 with the carrier 170. As set forth above, the insulating layers 168, the upper and lower interconnect panels 164,166 and the carrier 170 may be secured together by physical connectors, thereby forming a single, multi-component structure.

The body 184 of the carrier 170 may further include windows or holes 183 that are aligned with tie bars in the upper interconnect panel 164 and/or the lower interconnect panel 166. As described above, in each of the upper and lower interconnect panels 164,166, tie bars may temporarily connect together sections of the substrate 172 to facilitate manufacture and/or subsequent handling. These tie bars, however, have to later be severed or removed to permit the second BIS 162 to connect together the battery cells 14 in a desired manner. The holes 183 in the body 184 of the carrier 170 permit the tie bars to be accessed by a laser or a punch to sever or remove the tie bars after the upper and lower interconnect panels 164,166 have been mounted to the carrier 170, i.e., the holes 183 permit the BIS 162 to be debussed. Of course, the tie bars may be severed or removed (by laser or punching) from the upper and lower interconnect panels 164,166 before they are mounted to the carrier 170.

The overmold portion 192 of the carrier body 184 contains the lead frame 106, as well as the first and second connector housings 114, 117. The overmold portion 192 is located in the carrier 170 so as to be aligned with the slot 98 of the second BIS 162 and the inner chamber 38. An upper portion of the lead frame 106 is completely covered with polymer of the carrier body 184, except for the pads 115, which are exposed and disposed in recesses spaced inward from side edges of the overmold portion 192. The pads 115 are electrically and mechanically connected to the sensing contacts 100 of the upper and lower interconnect panels 164,166, respectively, such as by electron beam welding or laser beam welding. The pads 115 are connected by leads 116 to connector pins 120 that are arranged in a row or matrix that projects downward into the first connector housing 114 to form the connector 118, which couples with the connector 122 of the monitoring module 15. Some of the connector pins 120, however, are connected to connector blades 124 that extend into the second connector housing 117 to form the connector 126, which may be used for connecting the monitoring module 15 to a master controller for the vehicle battery system. The connector 126 is accessible through the opening 27 in the exterior wall 24c of the housing body 18.

As in the carrier 62, a portion (e.g., the overmold portion 192) of the carrier body 184 is disposed above the upper interconnect panel 164 and a portion (e.g., the connector housing 114) of the carrier body 184 is disposed below the lower interconnect panel 166.

The carrier 170 includes the first and second mounts 128,130, which project downwardly from opposing front and posterior sides of the carrier 170. As in the carrier 62 of the first battery module 10, the first and second mounts 128,130 include the first and second power connectors 132,134, which are secured to the first and second power tabs 90,92 of the lower interconnect panel 166. The first and second power connectors 132,134 are electrically isolated from the lead frame 106 by the insulating plastic of the carrier body 184.

The second BIS 162 is disposed on top of the upper cell holder 40a such that the openings 194 in the second BIS 162 are aligned with the openings 44 in the upper cell holder 40a, respectively. The upper cell holder 40a and the second BIS 162 are supported on the interior flange 32 of the housing body 18. The posts 34 of the housing body 18 may extend through aligned opening in the upper cell holder 40a and the second BIS 162 to help secure and maintain the alignment of these components within the housing body 18. With the second BIS 162 so positioned, the overmold portion 192 of the carrier 170 is positioned over the inner chamber 38 of the housing body 18 such that the connector 118 of the carrier 170 extends into the inner chamber 38, where it is connected to the connector 122 of the monitoring module 15.

Figure 24:
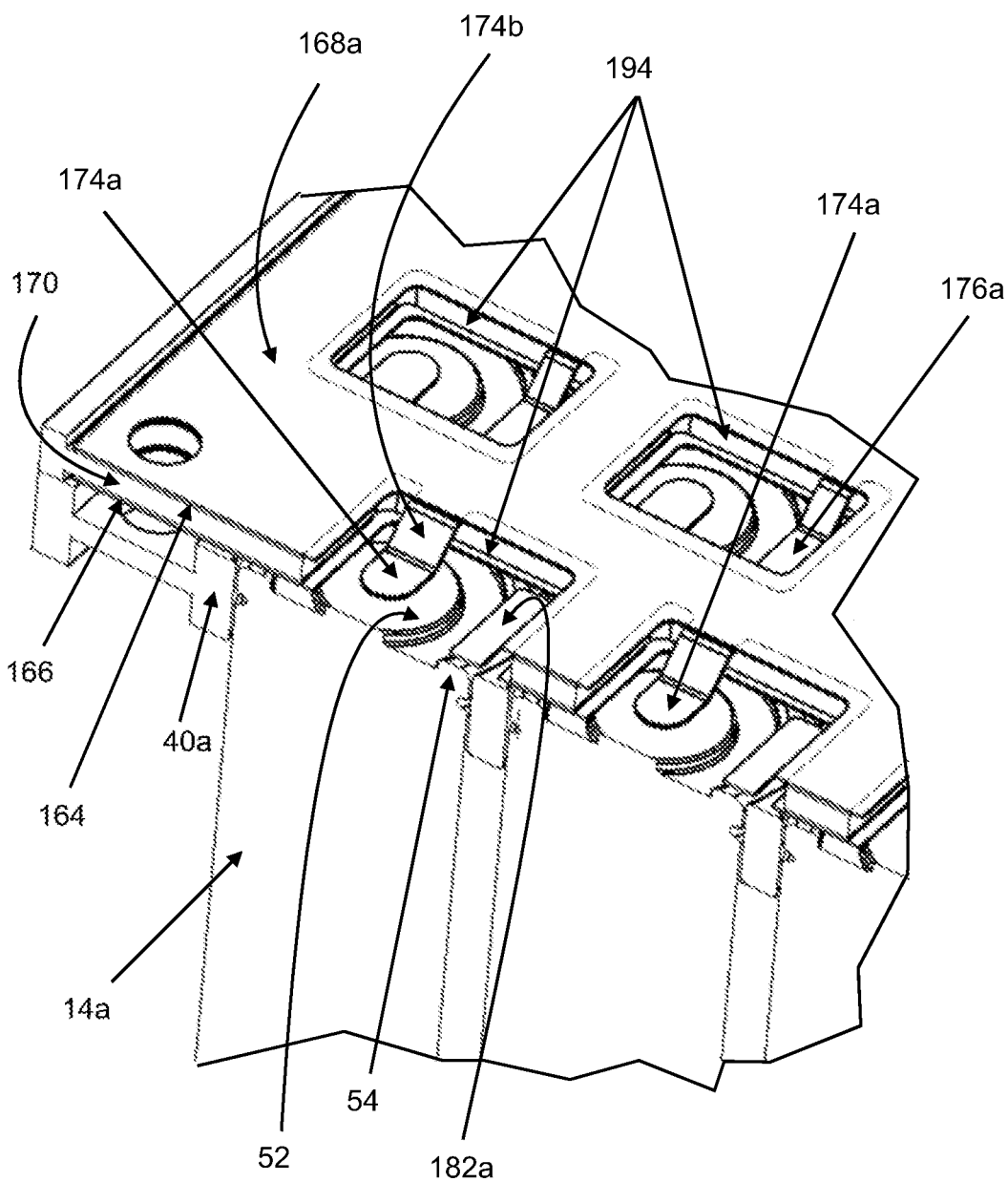
FIG. 24 shows a close-up sectional view of a portion of FIG. 18.

Referring now to FIG. 24, the second BIS 162 is shown interfacing with the battery cells 14. Each battery cell 14 is associated with an opening 44 in the upper cell holder 40a. More specifically, each battery cell 14 extends into an opening 44 of the upper cell holder 40a such that an upper portion of the battery cell 14 is surrounded by the interior surface of the substrate 42 defining the opening 44. As shown, top surfaces of the center positive terminals 52 and the surrounding annular negative terminals 54 of the battery cells 14 are disposed about flush with a top surface of the upper cell holder 40a.

Each battery cell 14 is also associated with an opening 194 in the second BIS 162. With regard to each opening 194 and its associated battery cell 14, the positive terminal 52 of the battery cell 14 is connected to a positive contact 174,180 of one of the upper and lower interconnect panels 164,166 and the negative terminal 54 of the battery cell 14 is connected to a negative contact 176, 182 of the other one of the upper and lower interconnect panels 164,166. For example, battery cell 14a has its positive terminal 52 connected to a positive contact 174 of the upper interconnect panel 164 and its negative terminal 54 connected to a negative contact 182 of the lower interconnect panel 166. As shown, the connector portion 174b for the positive contact 174 is bent downward, over the carrier 170, the lower interconnect panel 166 and the lower insulating layer 168b to place the pad portion 174a of the positive contact 174 in physical contact with the positive terminal 52, where they are secured together. The terminals 52, 54 of the battery cells 14 may be connected to the contacts 174, 176, 180, 182 of the upper and lower interconnect panels 164,166 by electron beam welding or laser beam welding.

It is to be understood that the foregoing description of the first and second battery modules 10, 160 is intended to be only illustrative, rather than exhaustive. Those of ordinary skill will be able to make certain additions, deletions, and/or modifications to the first and second battery modules 10, 160 without departing from the spirit of the disclosure or its scope. For example, instead of each battery module 10, 160 having two interconnect panels (upper and lower), each battery module 10, 160 may only have one interconnect panel, e.g. the upper interconnect panel 58, 164. In this embodiment, the single interconnect panel is separated into a plurality of sections, wherein the positive and negative terminals 52, 54 of each battery cell 14 are connected to separate positive and negative sections, respectively.

Another example is that in some embodiments, the various components of each of the battery modules 10, 160 may be arranged differently. More specifically, the lead frame 106, the connector 118, the inner chamber 38 and the monitoring module 15 may have a different location and/or orientation. For example, instead of having the inner chamber 38 (with the monitoring module 15 disposed therein) located in the housing body 18, midway between the exterior walls 24a,b, the inner chamber 38 (with the monitoring module 15) may be located along one of the exterior walls 24, or elsewhere. Other components of the battery modules 10, 160 may also have to be reconfigured and/or relocated to permit or facilitate the foregoing change in location and/or orientation.

Other modifications that may be made to the first and second battery modules 10,160 include changing the locations and/or orientations of the first and second power connectors 132,134. For example, in some embodiments, the first and second power connectors 132, 134 and their corresponding slot 28 and hole 29 may be moved so as to be located toward the center of the exterior walls 24a,b. In other embodiments, the first and second power connectors 132, 134 and their corresponding slot 28 and hole 29 may be moved to the exterior walls 24c,d, respectively.

What is claimed is:

1. A battery module comprising:
   a housing having a cover attachable to a body;
   a plurality of battery cells disposed in the housing, each of the battery cells comprising a pair of terminals;
   an upper interconnect panel stamped from a sheet of conductive metal, the upper interconnect panel having a plurality of first panel openings extending therethrough and including a plurality of first contacts that are secured to the terminals of the battery cells, respectively, the first contacts being at least partially disposed in the first panel openings, respectively;
   a lower interconnect panel stamped from another sheet of conductive metal, the lower interconnect panel having a plurality of second panel openings extending therethrough and including a plurality of second contacts that are secured to the terminals of the battery cells, respectively, the second contacts being at least partially disposed in the second panel openings, respectively;
   a carrier comprising a lead frame molded into a body of thermoplastic resin, wherein the lead frame is connected to a plurality of locations on the upper and lower interconnect panels, and wherein at least an upper portion of the body of the carrier is disposed above the upper interconnect panel and at least a lower portion of the body of the carrier is disposed below the lower interconnect panel; and
   a monitoring module connected to the lead frame; and
   wherein the upper and lower interconnect panels are connected to the battery cells to form a circuit arrangement, and wherein the monitoring module is operable to measure electrical properties of the circuit arrangement.

2. The battery module of claim 1, wherein the carrier includes a lead connector for connecting the lead frame to the monitoring module, the lead connector including a connector housing formed in the body of the carrier, the connector housing defining an interior in which contacts of the lead frame are disposed and having an opening through which the contacts are accessible.

3. The battery module of claim 2, wherein the carrier is disposed between the upper interconnect panel and the lower interconnect panel.

4. The battery module of claim 3, wherein the conductive metal of the upper and lower interconnect panels is copper or a copper alloy.

5. The battery module of claim 2, wherein the monitoring module includes a circuit board having a board connector secured thereto, the board connector and the lead connector having a plug-in engagement that connects the lead connector of the carrier to the circuit board.

6. The battery module of claim 5, wherein the board connector comprises a pin header that is at least partially disposed in the connector housing of the lead connector, and wherein the contacts of the lead frame are pins that are received in the pin header.

7. The battery module of claim 1, further comprising a thermistor or a fuse secured between portions of the lead frame.

8. The battery module of claim 1, wherein the body of the carrier has an upper surface at least partially surrounded by an upper flange and a lower surface at least partially surrounded by a lower flange, and wherein the upper interconnect panel adjoins the upper surface of the body and is disposed inward from the upper flange, and the lower interconnect panel adjoins the lower surface of the body and is disposed inward from the lower flange.

9. The battery module of claim 1, wherein the body of the housing defines an interior holding space in which the battery cells are disposed, and wherein the body includes at least one interior wall that at least partially defines an inner chamber that is delimited from the interior holding space.

10. The battery module of claim 9, wherein the monitoring module is disposed in the inner chamber.

11. The battery module of claim 1, wherein each battery cell is connected to one of the first contacts of the upper interconnect panel and one of the second contacts of the lower interconnect panel.

12. The battery module of claim 11, wherein some of the first contacts are connected to positive terminals of the batteries, respectively, and some of the first contacts are connected to negative terminals of the batteries, respectively; and wherein some of the second contacts are connected to positive terminals of the batteries, respectively, and some of the second contacts are connected to negative terminals of the batteries, respectively.

13. The battery module of claim 1, wherein the first and second interconnect panels comprise enlarged slots, respectively, which are aligned with each other, and wherein the carrier is disposed in the aligned slots.

14. The battery module of claim 13, wherein the conductive metal of the upper and lower interconnect panels is aluminum or an aluminum alloy.

15. The battery module of claim 1, wherein the carrier is disposed between the upper interconnect panel and the lower interconnect panel.

16. The battery module of claim 15, wherein the carrier has a plurality of carrier openings formed therein, wherein each one of the carrier openings is associated with one of the battery cells.

17. The battery module of claim 16, wherein the body of the carrier has an upper surface and a lower surface, and wherein a thickness of the body between the upper and lower surfaces is from about 2 to about 24 times the thickness of each of the upper and lower interconnect panels.

18. The battery module of claim 17, wherein the upper surface of the body is at least partially surrounded by an upper flange and the lower surface of the body is at least partially surrounded by a lower flange, and wherein the upper interconnect panel adjoins the upper surface of the body and is disposed inward from the upper flange, and the lower interconnect panel adjoins the lower surface of the body and is disposed inward from the lower flange.

19. The battery module of claim 1, wherein the carrier and the upper and lower battery interconnect panels form a battery interconnect system;
   wherein the carrier is thicker than each of the upper interconnect panel and the lower interconnect panel and has a plurality of carrier openings formed therein;
   wherein the upper interconnect panel has a plurality of upper panel openings formed therein;
   wherein the lower interconnect panel has a plurality of lower panel openings formed therein; and
   wherein the carrier openings, the upper panel openings and the lower panel openings are aligned to form a plurality of aligned openings, which extend through the battery interconnect system; and
   wherein each one of the aligned openings is associated with one of the battery cells.

20. The battery module of claim 19, wherein each aligned opening of the battery interconnect system has a first contact and a second contact disposed therein which are connected to the terminals of the battery cell associated with the aligned opening, respectively;

wherein each of the first contacts has a connector portion that is bent downward, over the carrier and the lower interconnect panel;

wherein some of the first contacts are connected to positive terminals of the batteries, respectively, and some of the first contacts are connected to negative terminals of the batteries, respectively; and wherein some of the second contacts are connected to positive terminals of the batteries, respectively, and some of the second contacts are connected to negative terminals of the batteries, respectively.

\* \* \* \* \*